(12) United States Patent
    Khajepour et al.

(10) Patent No.: US 10,816,491 B2
(45) Date of Patent: Oct. 27, 2020

(54) SYSTEM AND METHOD FOR REAL TIME CLOSED-LOOP MONITORING AND CONTROL OF MATERIAL PROPERTIES IN THERMAL MATERIAL PROCESSING

(71) Applicants: Amir Khajepour, Waterloo (CA); Mohammad Hossein Farshidianfar, Waterloo (CA); Adrian Gerlich, Waterloo (CA)

(72) Inventors: Amir Khajepour, Waterloo (CA); Mohammad Hossein Farshidianfar, Waterloo (CA); Adrian Gerlich, Waterloo (CA)

( * ) Notice: Subject to any disclaimer, the term of this patent is extended or adjusted under 35 U.S.C. 154(b) by 252 days.

(21) Appl. No.: 15/287,951

(22) Filed: Oct. 7, 2016

(65) Prior Publication Data
    US 2017/0102689 A1    Apr. 13, 2017

Related U.S. Application Data

(60) Provisional application No. 62/284,791, filed on Oct. 9, 2015.

(51) Int. Cl.
    *G06F 19/00*    (2018.01)
    *G01N 25/18*    (2006.01)
    (Continued)

(52) U.S. Cl.
    CPC .......... *G01N 25/18* (2013.01); *B29C 64/386* (2017.08); *B33Y 10/00* (2014.12); *B33Y 50/02* (2014.12); *G05B 19/4099* (2013.01); *B22F 3/1055* (2013.01); *B22F 2003/1056* (2013.01); *B22F 2999/00* (2013.01); *G01N 25/20* (2013.01); *G05B 2219/35134* (2013.01); *G05B 2219/49007* (2013.01); *Y02P 10/295* (2015.11); *Y02P 90/265* (2015.11)

(58) Field of Classification Search
    CPC ........ B33Y 30/00; B33Y 50/02; B33Y 10/00; B22F 3/1055; B22F 2999/10; B22F 2203/03; B22F 2203/11; B05B 12/082; B29C 64/386; B29C 64/393; G05B 2219/49007; G01N 25/20; G01N 25/18
    See application file for complete search history.

(56) References Cited

U.S. PATENT DOCUMENTS

2006/0198944 A1* 9/2006 Gevelber .............. B05B 12/082
                                                              427/8
2014/0163717 A1* 6/2014 Das ...................... B22F 3/1055
                                                              700/119
(Continued)

*Primary Examiner* — Tuan A Vu
(74) *Attorney, Agent, or Firm* — Gowling WLG (Canada) LLP; Jeffrey W. Wong

(57) ABSTRACT

The disclosure is directed at a method and apparatus for integrated real-time monitoring and control of microstructure and/or geometry in thermal material processing (TMP) technologies. The method includes obtaining real-time thermal dynamic variables, such as, but not limited to the cooling rate, peak temperature and heating rate, and geometry of the thermal material process. These real-time thermal variables are then analyzed along with a thermal model to determine a microstructure/geometry model. This microstructure/geometry model can then be used to provide the real-time monitoring and control of a finished state for the material being processed by the thermal material processing procedure.

13 Claims, 33 Drawing Sheets

(51) Int. Cl.
*G05B 19/4099* (2006.01)
*B33Y 10/00* (2015.01)
*B33Y 50/02* (2015.01)
*B29C 64/386* (2017.01)
B22F 3/105 (2006.01)
G01N 25/20 (2006.01)

(56) References Cited

U.S. PATENT DOCUMENTS

2016/0185048 A1\* 6/2016 Dave ................ B33Y 50/02
　　　　　　　　　　　　　　　　　　　　　700/119
2017/0056970 A1\* 3/2017 Chin ................ B33Y 30/00

\* cited by examiner

FIGURE 39a                    FIGURE 39b

SYSTEM AND METHOD FOR REAL TIME CLOSED-LOOP MONITORING AND CONTROL OF MATERIAL PROPERTIES IN THERMAL MATERIAL PROCESSING

FIELD OF THE DISCLOSURE

The disclosure is generally directed at thermal materials processing and, more specifically, at a system and method for integrated real-time monitoring of microstructure in thermal materials processing.

BACKGROUND OF THE DISCLOSURE

Thermal Materials Processing (TMP) technologies currently lack a method to monitor or control the geometry and/or microstructural properties of the processed materials. Trials and errors are used to arrive at suitable process parameters in TMP machines resulting in costly and unreliable process parameters tuning. Current monitoring and controlling techniques are only ideal for control of bulk material properties with low dimensional tolerances, and not suitable for local microstructure control. All microstructure control techniques in TMP processes are open-loop, which indicates that TMP microstructure cannot be monitored and modeled adaptively in real-time.

Material properties of TMP processes, which include rapid thermal cycles, are governed by the process thermal dynamics variables such as the cooling rate, peak temperature and heating rate. While, in theory these thermal dynamics have the most significant influence on microstructural evolutions, the complexity in recording them in real-time (especially the cooling and heating rate) has been a great obstacle in developing a real-time microstructure monitoring and controlling apparatus. There have been a couple of attempts to monitor the cooling and heating rate in real-time; however, none were successful due to rapid changes of the process conditions and high peak temperatures.

SUMMARY OF THE DISCLOSURE

The present disclosure is directed at a system and method for integrated real-time monitoring and control of microstructure and geometry in thermal materials processing (TMP) technologies, including but not limited to, laser heat treatment (LHT), laser additive manufacturing (LAM), laser alloying (LA), arc welding, or plasma deposition process. The system utilizes a real-time thermal monitoring system to provide indirect monitoring of microstructural evolution and material geometry, and a real-time imaging system for direct monitoring of remaining geometrical properties. The final part produced in any TMP technology should yield specific mechanical properties (geometry, strength, hardness, residual stress) and microstructural characteristics (morphology, grain size, phase precipitation, etc.). The thermal and imaging data recorded by the current invention are used in an automated, closed-loop TMP process to provide consistent microstructural and geometrical properties by controlling the desired thermal and geometrical values.

In one aspect of the disclosure, there is provided system for real-time monitoring and control of material microstructure or geometry in thermal materials processing (TMP) including apparatus for obtaining thermal dynamic variables in real-time; and apparatus for developing a microstructure or geometry model based on a thermal model and the thermal dynamic variables.

In another aspect, the apparatus for obtaining thermal dynamics variables in real-time includes a thermal monitoring apparatus; and a processor for calculating real time values for the thermal dynamic variables based on measurements from the thermal monitoring apparatus. The thermal dynamic variables include at least one of a cooling rate, a heating rate and a peak temperature. In another aspect, the thermal monitoring apparatus is an infrared camera, a combined two-pyrometer setup or a charge coupled device (CCD)/complementary metal oxide semiconductor (CMOS) camera with an optical filter.

In another aspect of the disclosure, there is provided a method for real-time monitoring of microstructure or geometry of materials used in a thermal materials processing (TMP) procedure including obtaining a thermal microstructure model; calculating a set of thermal dynamic variables; and applying the set of thermal dynamic variables to the thermal microstructure model.

In another aspect, calculating a set of thermal dynamic variables includes measuring a peak temperature value. In a further aspect, calculating a set of thermal dynamic variables includes calculating a temperature rate change value.

In yet another aspect of the disclosure, calculating a temperature rate change value includes determining a position vector and temperature value for a fixed spatial point; measuring a time delay; determining a transfer vector for movement of the fixed spatial point; determining an updated position vector and an updated temperature value for the fixed spatial point; calculating a difference between the updated temperature value and the temperature value; dividing the difference by the time delay.

BRIEF DESCRIPTION OF THE DRAWINGS

Embodiments of the disclosure will now be described, by way of example only, with reference to the attached drawings, in which:

FIG. 33b is a schematic diagram of box 33b in FIG. 33a;

FIG. 33c is a schematic diagram of box 33c in FIG. 33a;

FIGS. 39a to 39c are micrographs of lines G1, G2 and G3 at high cooling rate (closed-loop control at 850° C./s);

DETAILED DESCRIPTION

The disclosure is directed at a method and apparatus for integrated real-time monitoring and control of microstructure and geometry in thermal material processing (TMP) technologies. The method includes obtaining real-time thermal dynamic variables, such as, but not limited to the cooling rate, peak temperature and heating rate, and geometry of the thermal material process. These real-time thermal variables are then analyzed along with a thermal model to determine a microstructure/geometry model. This microstructure/geometry model can then be used to provide the real-time monitoring and control of a finished state for the material being processed by the thermal material processing procedure.

TMP technologies or procedures are a series of operations that transform materials during a thermal cycle from an initial state to a final state where enhanced material properties are obtained.

Figure 1:
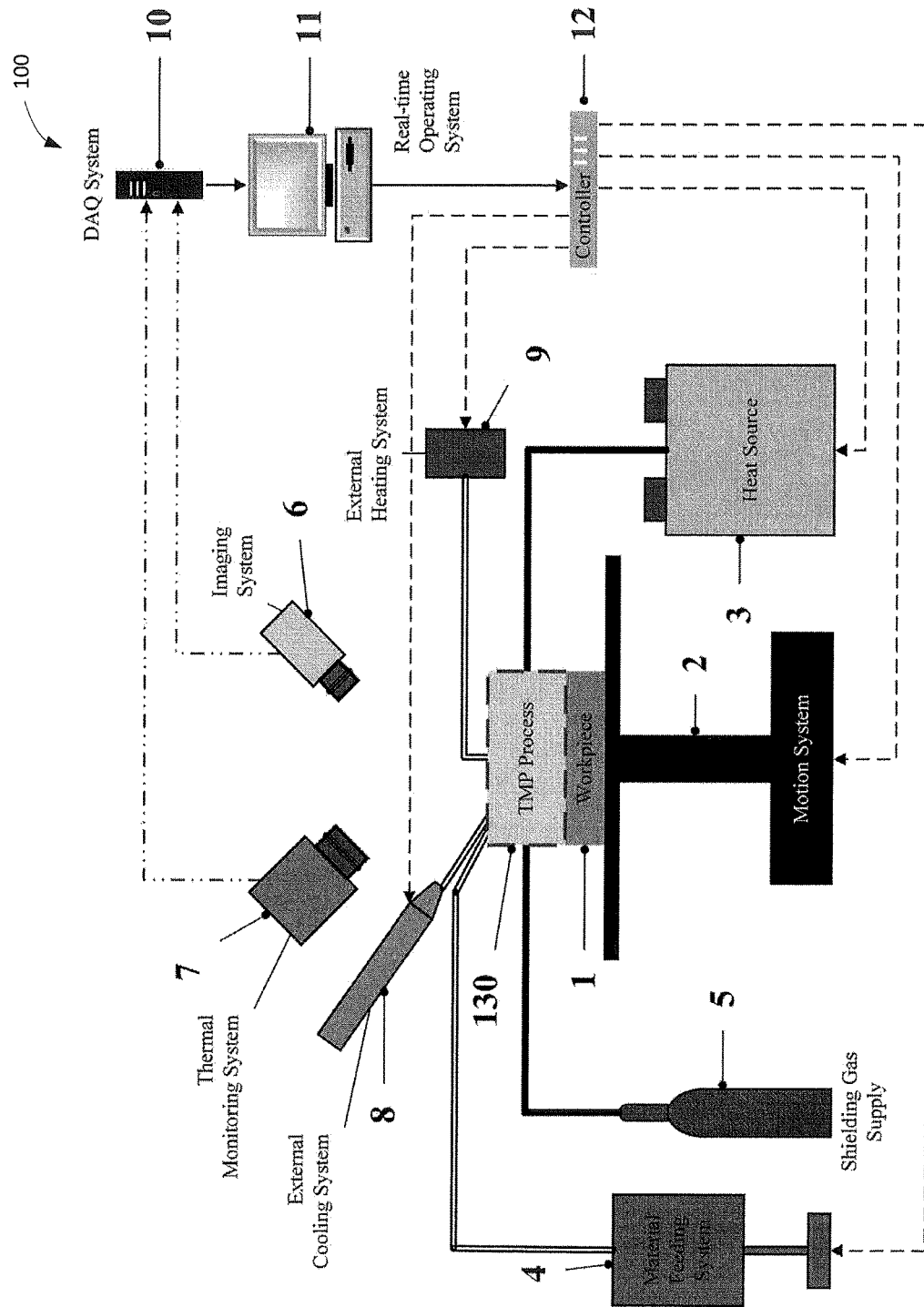
FIG. 1 is a schematic diagram of a system for thermal materials processing (TMP)

Turning to FIG. 1, a system for integrated real-time monitoring and control of microstructure and geometry in a TMP procedure is shown. In operation, the TMP process, or procedure, 130 is performed on a workpiece 1 which is typically placed atop a platform of a motion system 2. The thermal process 130 may include the use of various parameters including, but not limited to, the traveling speed of the workpiece 1 and the heating power being applied to the workpiece. The system 100 further includes a heat source 3 and a shielding gas supply 5 which provide inputs to the TMP 130 to heat and/or cool the workpiece as the TMP procedure is being performed. In one embodiment, the heat source 3 is a laser, plasma heat, a fire and the like.

The system 100 may further include an imaging system 6 and a thermal monitoring system 7 located proximate the workpiece 1 to obtain images of the workpiece as the TMP process is being performed on the workpiece and to obtain thermal readings, respectively. The imaging system 6 and the thermal monitoring system 7 deliver, or transmit, the obtained, or retrieved data, or information to a data acquisition (DAQ) system 10 which operates in conjunction with a real-time operating system 11. In one embodiment, the thermal monitoring system may be an infrared camera, a combined two-pyrometer setup or a charge coupled device (CCD)/complementary metal oxide semiconductor (CMOS) camera with an optical filter. The real-time operating system is in communication with a controller 12 that controls the inputs to the TMP 130, such as but not limited to the heat source 3 and the motion system 2. The controller may also control the shielding gas supply 5.

In some embodiments, the system 100 may also include a material feeding system 4, an auxiliary cooling system 8, and an auxiliary heating system 9 which are also controlled by the controller 12. The inclusion of these systems depends on the TMP process being performed on the workpiece 1 and the desired microstructure and/or geometry of the finished part.

The material feeding system 4 is used to feel material, such as another metal, for mixing with the workpiece, if the TMP procedure includes an additive material part. This will be described in more detail below.

Figure 2:
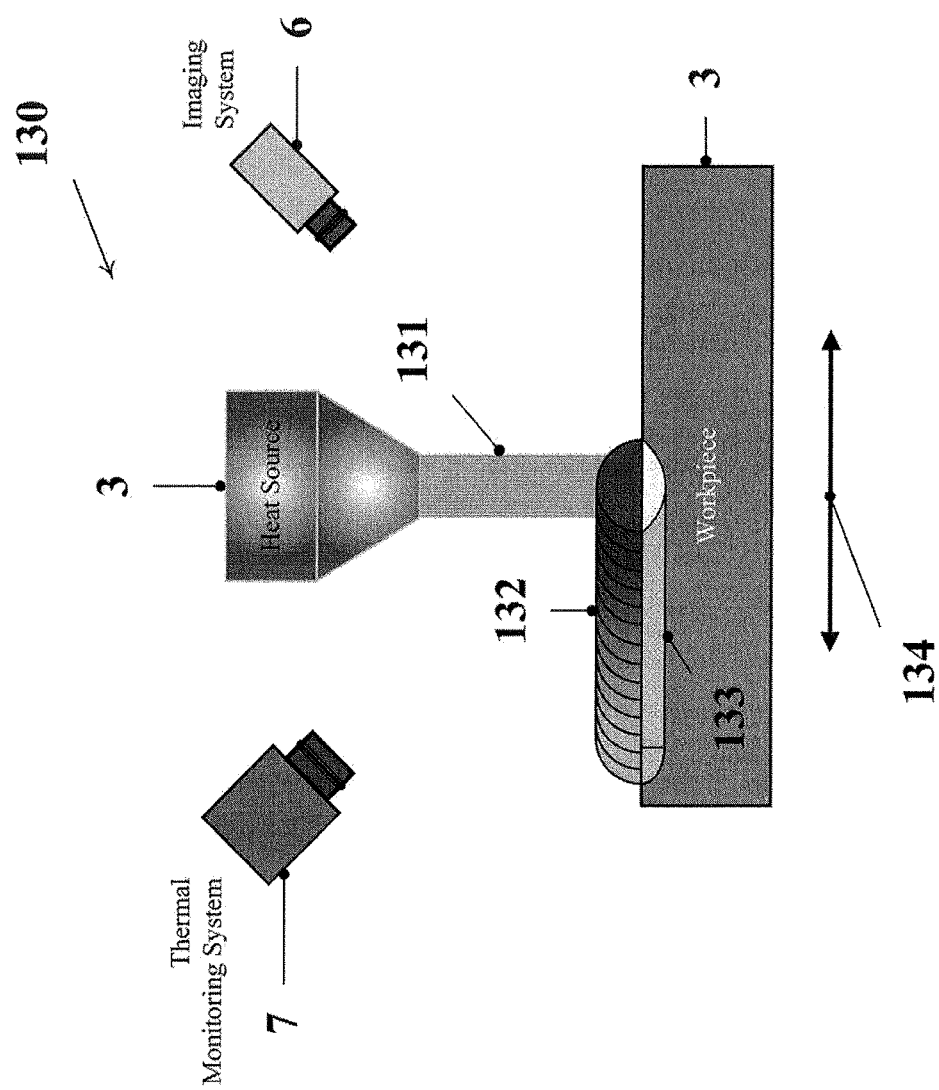
FIG. 2 is an enlarged view of parts of the system of FIG. 1.

Turning to FIG. 2, a schematic diagram of a portion of the system of FIG. 1 is provided. As part of the TMP process 130, the system 100 may enhance material properties of a surface 133 of the workpiece 1 or to enhance additive material 132 being applied to the workpiece 1 to produce a finished part. In the current embodiment, the additive material 132 is fed by the material feeding system 4. In one embodiment, the TMP process 130 is assisted by using heat energy 131 (generated by the heat source 3) and a translational movement of the workpiece 1 (such as in the direction of arrow 134) by the motion system 2 with respect to the heat source 3. These may be seen as the laser power and CNC travelling speed parameters as outlined above. The changes in the material properties of either or both of the additive material 132 and the workpiece 1, as the TMP procedure is being performed on the workpiece 1 are preferably captured by the imaging system 6 and/or the thermal monitoring system 7.

Figure 3:
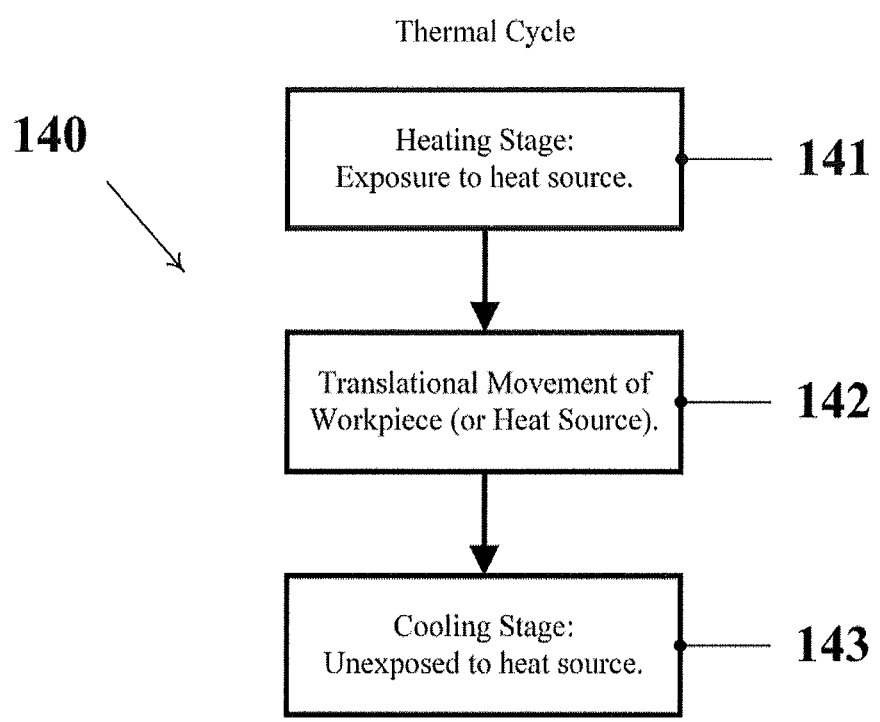
FIG. 3 is a flowchart outlining a method of TMP.

During the TMP process 130, the materials undergo a thermal cycle in order to achieve enhanced materials properties. In effect, this is changing the microstructure of the workpiece or the additive material. As shown in FIG. 3, a first embodiment of a TMP process is shown. In this method, the heating energy 131 and translational movement 134, produce a thermal cycle 140, which includes three stages. The first stage may be seen as a heating stage 141 which may include the rapid heating of a pre-defined, or predetermined, location on the workpiece 1 or of additive material 132 fed (or preplaced) on a predetermined location on a surface of the workpiece 1, by a concentrated heat source.

With respect to the heating stage, during a TMP process 130, the workpiece 1 or additive metallic material 132 may transform from its original solid state to another state, such as a liquid (solidification) or liquid-solid (partial solidification) state or may remain solid during the thermal cycle 140. In some embodiments, additive material 132 (in the form of powder, wire, paste and etc.) is fed on to the surface of the workpiece or preplaced (similar but not limited to a powder bed system) on the workpiece 1 and heated up by the heat source 3 for deposition on the workpiece 1 or underlying layers of deposition.

The second stage may be seen as a translational movement stage 142 whereby the workpiece 1 is moved with respect to the heat source 3 or the heat source 3 is moved with respect to the workpiece 1. This translational movement stage 2 is preferably performed by the motion system 2. The final stage may be seen as a cooling stage 143 which includes a rapid cooling of the heated region of the heating stage. This cooling may be performed via the translational movement 134 between the workpiece and the heat source and/or exposure of the heated region to a cooling source, such as the shielding gas supply 5 or the external cooling system 8.

The part, or workpiece 1, processed by the TMP process generally has two sets of characteristics namely (1) mechanical properties including, but not limited to, geometry, strength, hardness and residual stress, and (2) microstructural properties including, but not limited to, morphology, grain size and phase precipitation. The objective of any TMP process is to obtain enhanced material properties of the workpiece 1 such as, but not limited to, enhanced hardness, yield strength and wear. Each of these properties relate to the microstructural characteristics of the finished part. It is also beneficial to achieve specific geometrical dimensions and tolerances of the finished part produced by the TMP process. Therefore, monitoring and controlling microstructural and geometrical properties of the workpiece during any TMP process is of importance for or benefit to industrial TMP applications. In one embodiment, this may be achieved by monitoring the thermal dynamic variables, such as the cooling rate or the heating rate of the thermal cycle in real-time.

Since the TMP procedure is typically a thermal process defined by the thermal cycle 140, the microstructural and geometrical properties of the finished part are governed by the dynamics of the thermal cycle 140. Measuring and monitoring most geometrical properties during the TMP procedure is convenient to achieve through normal image acquisition and processing. Some examples include measuring height or width of deposition during laser additive manufacturing (LAM) or width of hardened track during laser heat treatment (LHT). However, measurement and monitoring of microstructural properties and some geometrical properties including but not limited to, hardening depth during heat treatment processes, are generally not achievable through normal image acquisition and processing techniques.

Figure 4:
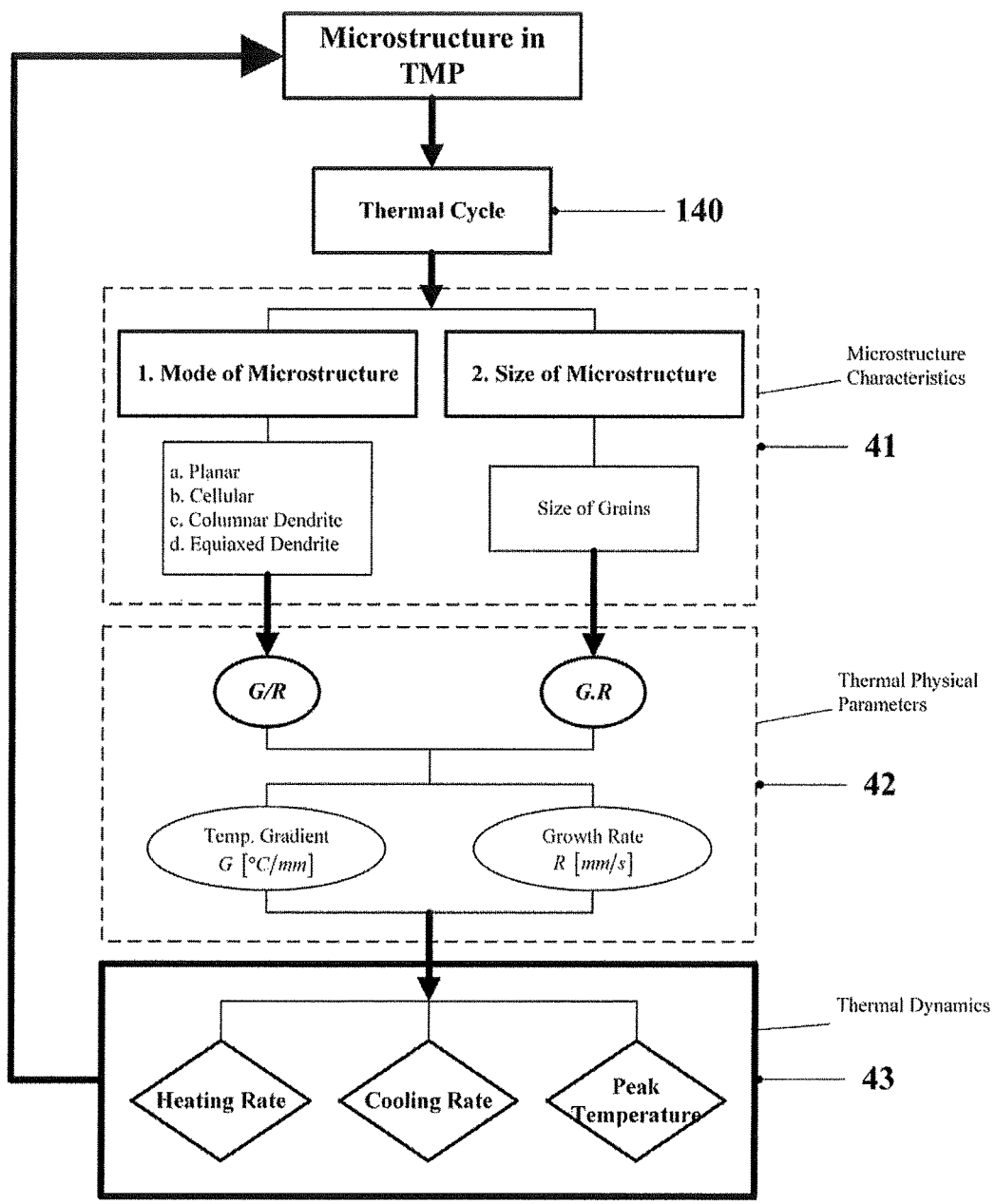
FIG. 4 is a schematic diagram of microstructure formation with respect to TMP.

To better understand the formation of a microstructure and its' governing parameters in a TMP process, FIG. 4 illustrates a breakdown of the TMP thermal cycle 140 and microstructure characteristics. As shown in FIG. 4, the microstructure resulting from the TMP procedure generally has two main characteristics 41. These characteristics are (1) the mode of the microstructure, and (2) the size of the microstructure. The mode of the microstructure includes, but is not limited to, planar, cellular, columnar dendrite and equiaxed dendrite while the size of microstructure is related to the size of its grains.

These two characteristics are primarily governed by two thermal physical parameters 42, namely (1) temperature gradient (G/R), which is the tangent of the temperature profile with respect to distance at the state transformation interface (e.g. solid-liquid interface) and (2) growth rate (G.R.), which is the travel speed of the state transformation interface (e.g. solid-liquid interface). Thus, to control all microstructural properties during the TMP process, real-time knowledge of the thermal dynamics, variations, or variables, 43 affecting these parameters is required. In other words, it is these thermal dynamics variables 43 that govern the TMP microstructure that is produced within the finished part whereby by monitoring and controlling these variables, the resulting microstructure may be controlled. Moreover, theses thermal variables 43 also define geometrical properties, including ones which may not be monitored or determined with known image acquisition and processing techniques.

As shown in FIG. 4, the heating rate, cooling rate and peak temperature of the workpiece or additive material being applied to the workpiece, are three thermal dynamics variables 43 that govern the microstructure of the finished part after undergoing a TMP process. These variables tend to be more significant variables that require to be monitored, although other thermal dynamic variables 43 can also be considered.

The measurement of the cooling rate and heating rate during a TMP process has proven difficult in the past due to the very high rates of the thermal cycle and the limitation of thermal monitoring apparatus. Therefore, only passive and offline measurement techniques are currently available to record the cooling rate and heating rate during TMP processes, specially processes with a very fast thermal cycle, including but not limited to, laser materials processing (LMP) technologies.

Figure 5:
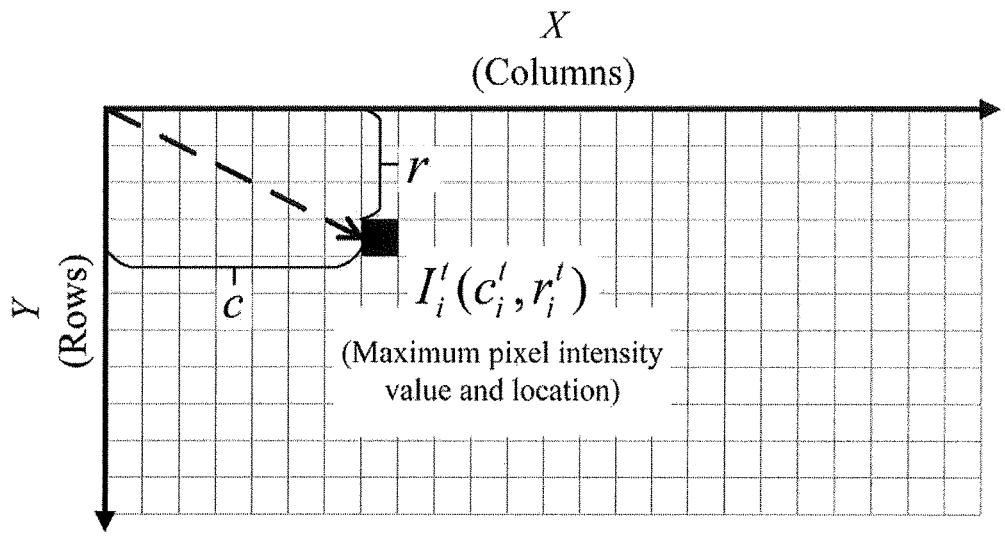
FIG. 5 is a thermal pixel array of a workpiece (or deposition) during TMP.

The current disclosure is directed at a method and system to obtain or determine real-time measurements of these thermal dynamic variables, such as the cooling rate and heating rate signals, during a TMP procedure. In order to understand the method and system, one needs to consider the heated surface of the workpiece (including the additive material) as a 2-dimensional (2-D) array of pixels (or grids), as shown in FIG. 5. This array coordinate system moves with the translational movement 134 (shown in FIG. 2). Each spatial point $P_i$ (or pixel) on the workpiece has an intensity I and a position vector (c,r) in the array at time t, which is represented by $I_i^t(c_i^t, r_i^t)$. The intensity of each pixel $I_i^t$ can be converted to an actual temperature of that pixel $T_i^t$, through the thermal monitoring system 7 (shown in FIG. 1) using calibration data.

Figure 6A:
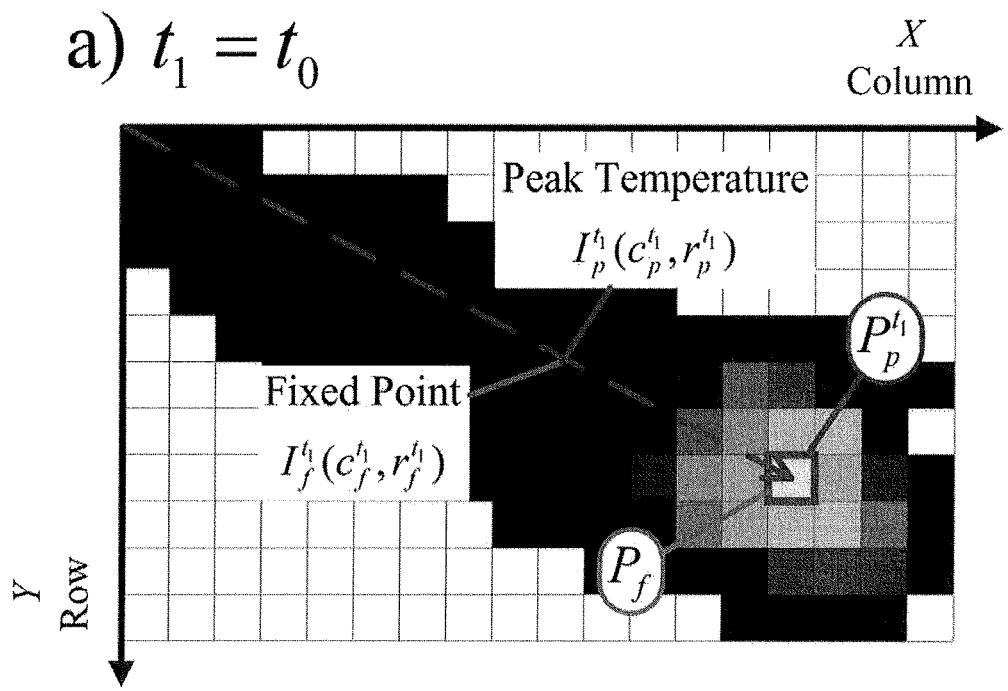
FIGS. 6a and 6b are pixel arrays reflecting movement of a fixed spatial point on the workpiece (or deposition)
Figure 6B:
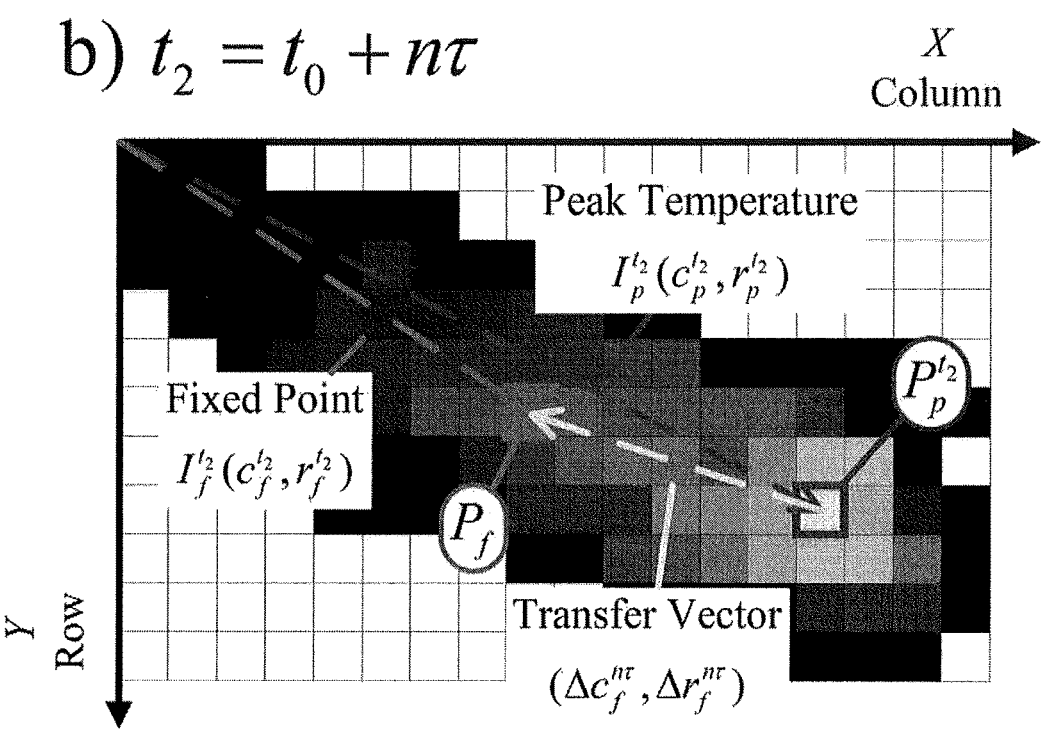

An example of how to obtain a cooling rate is shown with respect to FIGS. 6a and 6b which illustrate two schematic pixel arrays at times $t_1 = t_0$ (FIG. 6a) and $t_2 = t_0 + n\tau$ (FIG. 6b), in which $\tau$ is the sampling time of the thermal monitoring system 7 and n is the total number of sampling times elapsed after initial time $t_1$. Point $P_p^t$ is the instantaneous peak temperature of the TMP process that has a maximum intensity in the pixel array.

At time t, $P_p^t$ is represented by intensity and position vector $I_p^t(c_p^t, r_p^t)$, with temperature $T_p^t$. Point $P_f$ can be seen as a fixed spatial point on workpiece (or deposition) with $P_p^{t1}$ representing the peak temperature at time $t_1$, with intensity and position vector $I_p^{t1}(c_p^{t1}, r_p^{t1})$. At time $t_1$, the fixed spatial point $P_f$ has an intensity and a position vector $I_f^{t1}(c_f^{t1}, r_f^{t1})$, with temperature $T_f^{t1}$.

After a translational movement has been performed on the workpiece, at time $t_2$, the fixed spatial point $P_f$ moves with the translational motion inside the pixel array resulting in a new intensity and position vector $I_f^{t2}(c_f^{t2}, r_f^{t2})$ with a temperature $T_f^{t2}$. The transfer vector $(\Delta c_f^{trt}, \Delta r_f^{trt})$ is the distance travelled by point $P_f$ inside the pixel array from time $t_1$ to $t_2$.

By using a thermal monitoring system 7 capable of measuring two temperature points in a single time frame and in two different sample times, information can be collected as shown in FIGS. 6a and 6b during the TMP process.

By obtaining this information, the real-time cooling rate, $C_f^t$, can be obtained. The calculation of the cooling rate may be enhanced using the thermal dynamic algorithm 700 shown in FIG. 7. The same methodology or a similar methodology can be used to obtain the heating rate in real-time, $H_f^t$.

It can be seen in FIG. 6a that at time $t_1$, $P_f$ can also be the peak temperature pixel; therefore, $T_f^{t1} = T_p^{t1}$. It is recommended that point $P_f$ be selected as the instantaneous peak temperature $P_p^t$, such that when resetting point $P_f$ at the end of each cooling rate calculation in thermal dynamic algorithm 700, the new peak temperature pixel at time $t_2$ (which is $P_p^{t2}$) is selected as the new $P_f$. Therefore, the real-time cooling rate and heating rate of the instantaneous peak temperature, $C_p^t$, and $H_p^t$), respectively, may be calculated at each sample time. However, it has to be mentioned that point $P_f$ can be any fixed spatial point on the workpiece (or deposition). Therefore, this method can be used to measure the real-time cooling or the real-time heating rate of any point on the workpiece (or deposition).

Figure 7:
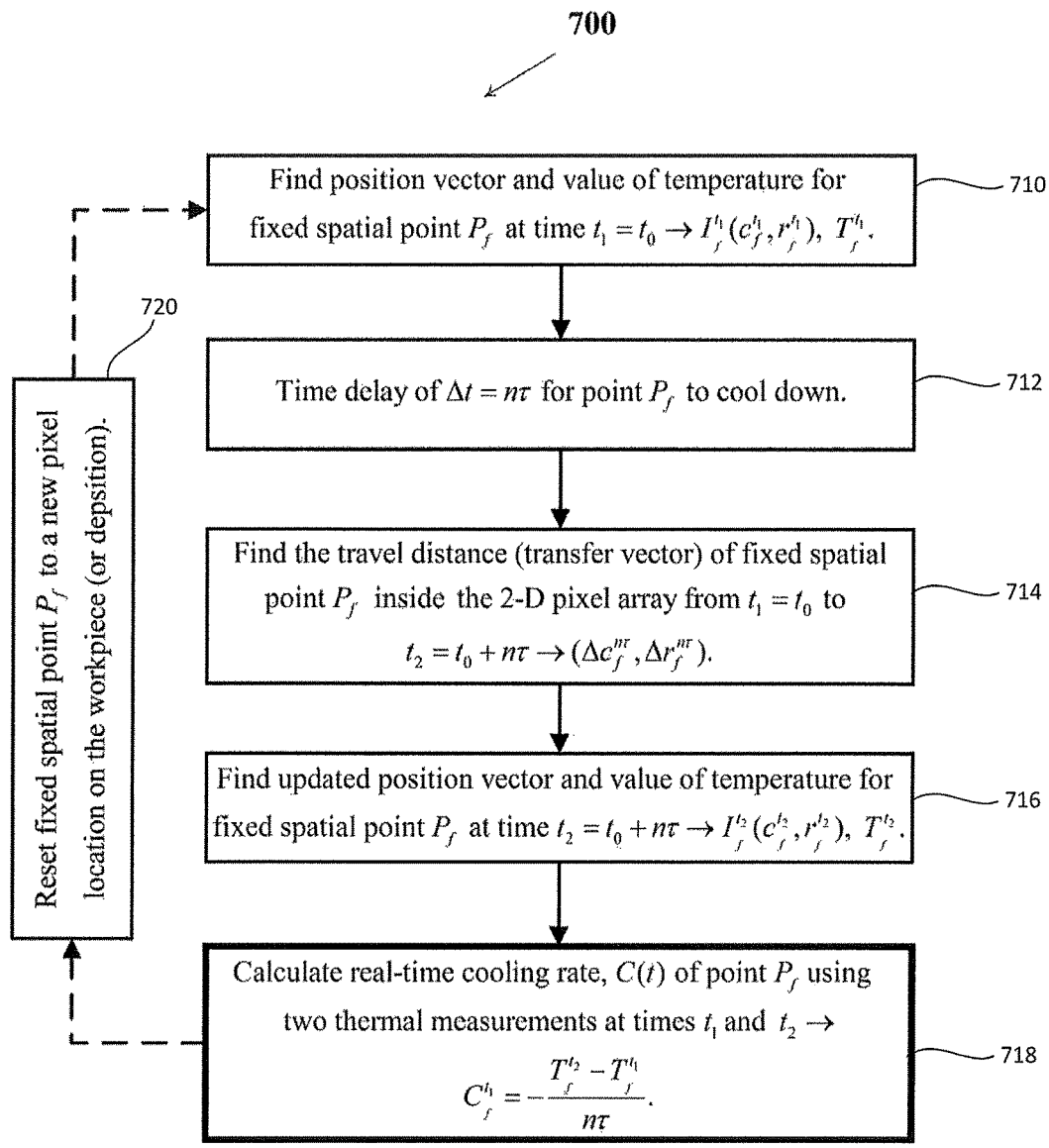
FIG. 7 is a flowchart outlining a thermal dynamic algorithm for extracting the real-time thermal dynamic variable information.

Turning to FIG. 7, a flowchart outlining a first embodiment of an algorithm for calculating a thermal dynamic variable is shown. Initially, a position vector for a spatial point is determined, or located 710. This is preferably performed for a fixed spatial point. After a time delay is determined 712. This time delay may be seen as a cool down period. The distance travelled by the spatial point is then calculated 714. An updated position vector and a temperature value for the spatial point is then determined 716. After, a real-time cooling rate can be calculated based on a pair of thermal measurements 718. New calculations can then be performed by selecting a new spatial point 720.

Thermal monitoring system 7 can be used to extract the thermal information illustrated in FIGS. 6a and 6b, which includes the maximum pixel intensity location and temperature that is the peak temperature $T_p^t$. The complete thermal pixel array information can then be inserted into the thermal dynamic algorithm 700 to obtain real-time cooling rate $C_f^t$ and/or the real-time heating rate $H_f^t$. In order to obtain the main thermal dynamic variables 43, including the calculation of the cooling rate and/or heating rate, these values may be obtained in real-time using the real-time thermal dynamic monitoring scheme 800 shown in FIG. 8.

Figure 8:
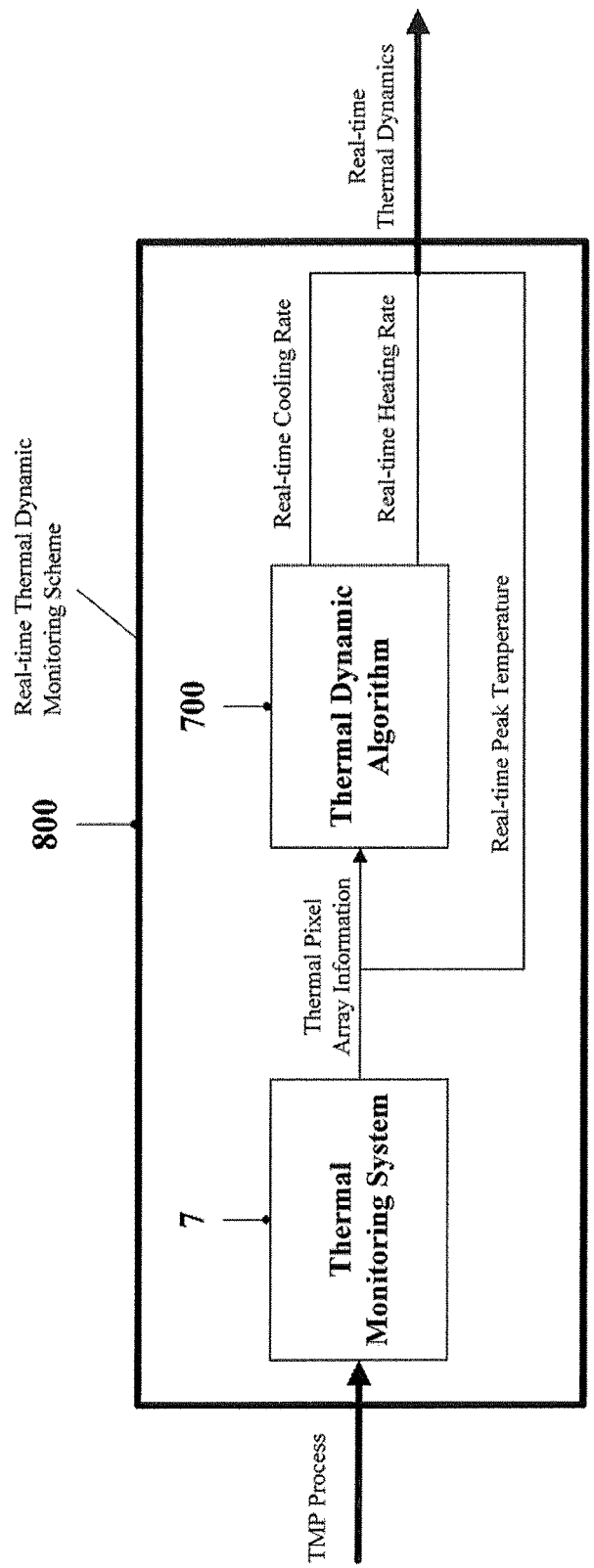
FIG. 8 is a schematic diagram of a system for a real-time thermal dynamic monitoring scheme.

As shown in FIG. 8, outputs from the thermal monitoring system 7 may be used for the thermal dynamic algorithm, 700. These outputs may be seen as thermal pixel array information. Outputs from the thermal dynamic algorithm 700 include, but are not limited to, a real-time cooling rate and/or a real-time heating rate. A real-time peak temperature value may be provided by the thermal monitoring system 7 and all three of these values or rates may be seen as real-time thermal dynamics or real-time thermal dynamics variables.

Due to the harsh environment and rapid thermal cycles typically present during a TMP procedure, direct monitoring of microstructural properties during TMP processes is difficult. As a result, conventional microstructure analysis systems such as Scanning Electron Microscopy (SEM) machines, are either not suited for the TMP environment or very expensive. Moreover, some geometrical properties of certain TMP processes such as the hardening depth during heat treatment processes through normal imaging systems 6 (including but not limited to CCD/CMOS cameras) is difficult.

Figure 9:
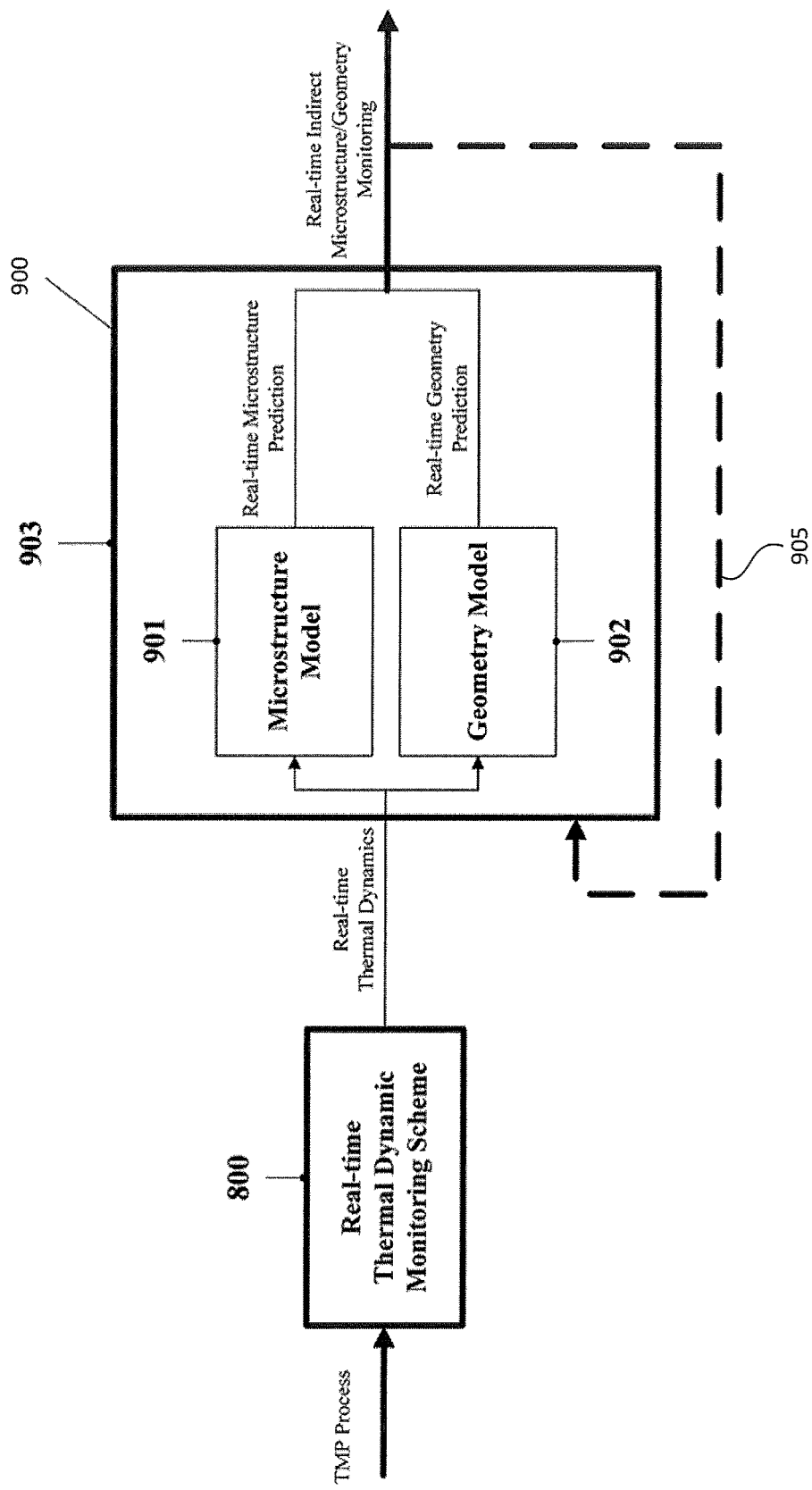
FIG. 9 is a schematic diagram of an indirect real-time microstructure/geometry monitoring scheme.

The current disclosure is directed at a method and system for indirect monitoring of microstructural and certain geometrical properties of the TMP process in real-time such as schematically shown in FIG. 9. Since both microstructural and geometrical properties of a TMP process are indirectly defined by the thermal dynamics 43 (as discussed with respect to FIG. 4), models can be developed for the microstructure model 901 and geometry model 902, which provide microstructural and geometrical properties based on these real-time thermal dynamics variables of the TMP process. When the thermal-microstructure model 901 and thermal-geometry model 902 are developed, they can be integrated together to construct a combined microstructure/geometry model 900.

The thermal-microstructural 901 and thermal-geometrical 902 models can be initially developed using different methods including empirical, analytical and numerical methods. In one embodiment, the general knowledge of thermal-microstructural and thermal-geometrical relations for TMP procedures can be obtained through correlation of the real-time thermal dynamics variables 43 with output properties. As an example, offline correlations between microstructural phase percentages, hardness or hardening depth and thermal dynamic recorded data can be used to develop the combined microstructure/geometry model 903 based on the thermal dynamic variables. Another suggested method is to construct a process map for the model 903, relating the thermal dynamic variables to the microstructure/geometry. As an example, a microstructure map similar to continuous cooling transformation (CCT) and continuous heating transformation (CHT) diagrams can be developed offline where the different microstructure phases are predicted based on the cooling rate, heating rate and the peak temperature.

As shown in FIG. 9, integrating the real-time thermal dynamic monitoring scheme 800 and microstructure/geometry model 903 provides an indirect real-time microstructure/geometry monitoring scheme 900 for use in or during TMP processes. According to this method, initially, the real-time thermal dynamic variables of the TMP process are recorded, or determined, by the real-time thermal dynamic monitoring scheme 800, and then fed into the microstructure/geometry model to obtain predictions of changes in the microstructure and geometry. Since the thermal dynamic variables are recorded in real-time, the outputs of the microstructure/geometry model provide real-time information of how the microstructure or geometry are evolving during the TMP process.

Finally, the microstructure/geometry model can be updated online with the real-time microstructure and geometry models data during the process (dotted feedback signal 905 in FIG. 9). An adaptive scheme is developed if the model is updated online. Therefore, a generalized real-time adaptive microstructure/geometry monitoring scheme for TMP processes can be achieved through the two-step indirect thermal dynamic approach shown in FIG. 9. This monitoring scheme will provide an understanding of how the microstructure and geometry of the materials of the TMP process are changing with the process inputs, during the process and in real-time.

Figure 10:
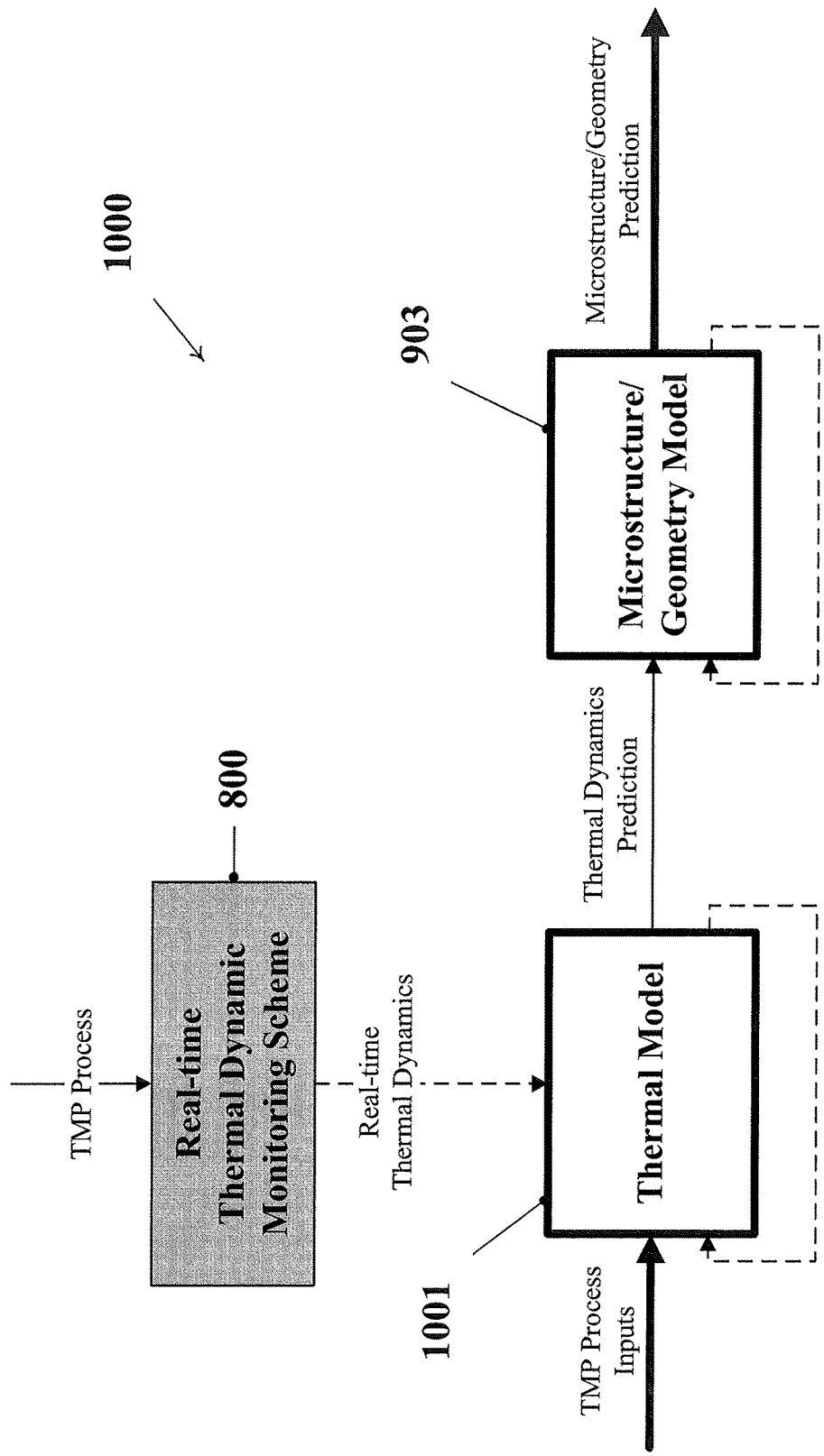
FIG. 10 is a schematic diagram of an adaptive thermal-microstructure model.

In addition to feedback signals of the geometry and microstructure provided by the thermal monitoring system 7 and imaging system 6, an actual model of these microstructural and geometrical variations based on the TMP process inputs may also be used to assist in the control of desired microstructure and geometry output values. Having the model and also the feedback signals, different constructions of feedback and feedforward controllers can be developed and implemented. However in order develop a complete model, a thermal model is also required to predict thermal dynamic changes based on TMP process inputs. Therefore, to construct a direct model between the TMP inputs (heating power and translational movement) and microstructural/geometrical changes, a two-step modeling process may be used, such as schematically shown in FIG. 10.

First, a thermal model 1001 is developed to identify thermal variations based on the TMP process inputs. The thermal modeling can be carried out in different methods including but not limited to, analytical and empirical modeling. Most TMP processes are black box models, which are very sensitive to process disturbances. Hence, an adaptive model that can adaptively change with respect to process conditions is suitable. The model can be advanced to an adaptive model with changing adaptive parameters in real-time based on the real-time thermal dynamic variables during the TMP procedure and also the model error during the process in real-time.

One possible method is to use an adaptive Lumped Capacitance (LC) model for the thermal model 1001, which is suitable for TMP processes. The LC modeling reduces a thermal system to a number of discrete lumps in which the temperature difference between the lumps is negligible. The LC model is a common approximation in cases with transient conduction, similar to the TMP process in which the heat conduction within the workpiece is much faster than heat transfer across the boundaries. Using real-time thermal dynamic variable data and the online error of the model itself, the electrical components of the LC model can be updated and modified adaptively. Another suggested way to construct an adaptive thermal model is to use a 2-D or 3-D simplified conduction model for the thermal model 1001 with updating boundary conditions that are updated in real-time with thermal dynamic signals provided through the real-time thermal dynamic monitoring scheme 800.

On the other hand, the thermal variable data provided by the real-time monitoring system may be used as a basis for different empirical modeling techniques. Knowledge-based system identification techniques such as fuzzy modeling and neural network modeling can also be used to implement an adaptive thermal model 1001.

Microstructural and geometrical variations can also be modeled in a microstructure/geometry model 903, through thermal dynamic variations as discussed in FIG. 9. If the adaptive thermal model 1001 is integrated with microstructure/geometry model 903, a thermal-microstructure model 1000 for predicting the microstructure may be developed as shown in FIG. 10. While both of the models in FIG. 10 are preferably constructed offline they are preferably adaptively updated online, or in real-time, based on the real-time thermal dynamic recordings of the real-time thermal dynamic monitoring scheme 800 and the online error of the models themselves. The determination of these real-time thermal dynamic variable recordings is described above.

Although, TMP is capable of processing a broad range of metals, alloys, ceramics and metal matrix composites (MMCs), the mechanical properties (geometry, strength, hardness, residual stress) and microstructural characteristics (morphology, grain size, phase precipitation, etc.) of the depositions are difficult to be tailored to a specific application. Process disturbances may cause variations in the properties between reproduced processing cycles performed using the same operating conditions. This poor reproducibility arises from the high sensitivity of TMP processes to small changes in the operating parameters and process disturbances. Some TMP processes (including but not limited to LMP processes) involve complex non-equilibrium physical and chemical metallurgical processes, which exhibit multiple modes of heat and mass transfer such as Marangoni flow, buoyancy, convection, and in some instances, chemical reactions.

Complex metallurgical phenomena during TMP processes are strongly material and process dependent and are governed by process parameters (e.g. heat power, heat source type, translational movement speed, heat spot size, scan line spacing and additive material characteristics). While real-time controllers have been developed for controlling the geometry and offline open-loop controllers have also been developed for the microstructure individually, however, currently when one output property is controlled the other is not. Therefore, in one aspect of the disclosure, the disclosure is directed at an integrated real-time controller to simultaneously control both properties of the microstructure/geometry model in a closed-loop process.

The indirect real-time microstructure/geometry monitoring scheme 900 can be implemented inside a closed-loop process to control the thermal dynamic variables in order to indirectly control the output properties. Although, all microstructural characteristics 41 can be indirectly monitored using the indirect real-time microstructure/geometry monitoring scheme 900, not all geometrical properties can be monitored using this method and thus require direct measurement. The imaging system 6, including but not limited to, CCD and CMOS cameras, can be integrated into the TMP process to monitor the remaining geometrical properties such as the height of deposition during metal deposition technologies, directly.

Figure 11:
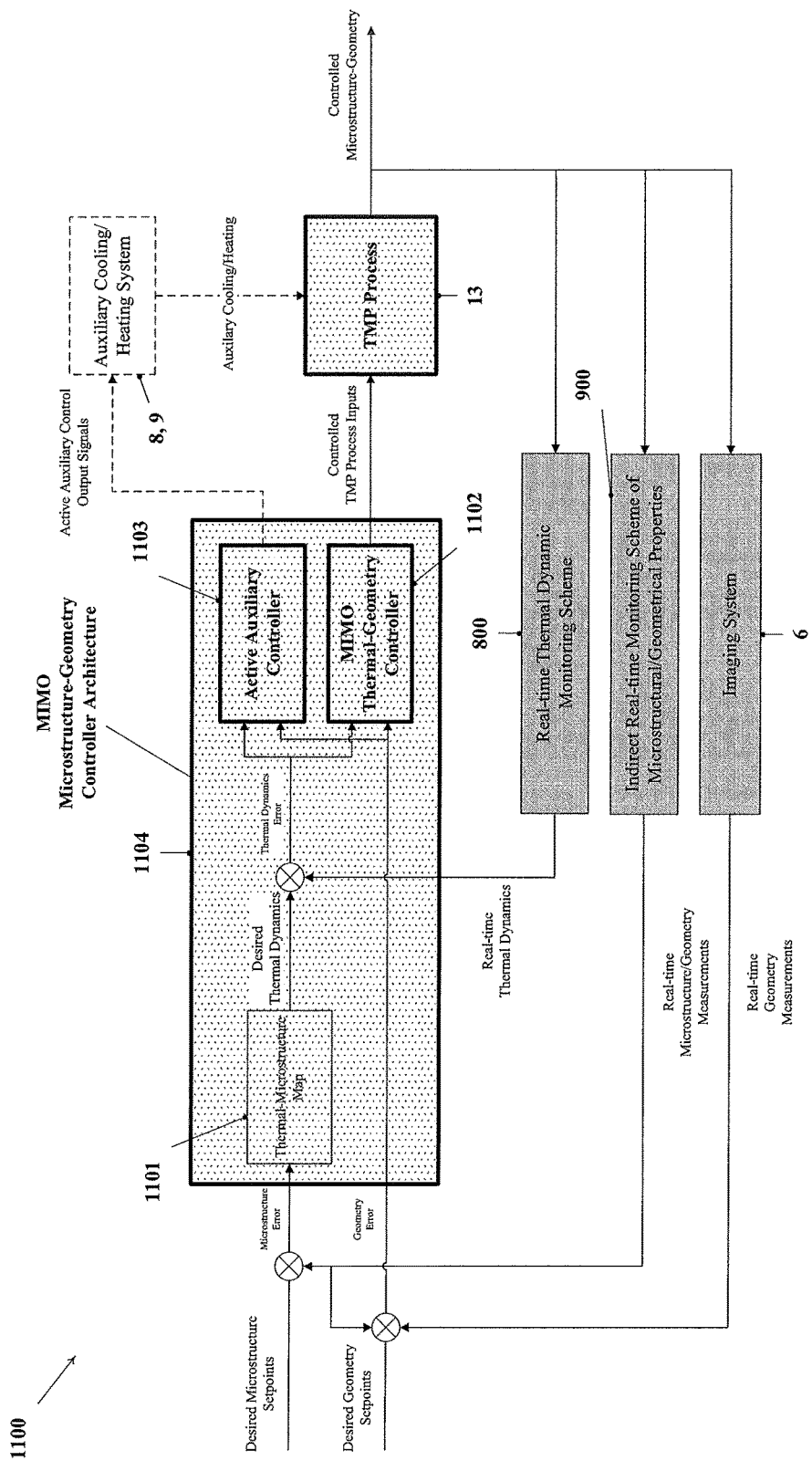
FIG. 11 is a shcematic diagram of an integrated closed-loop microstructure and geometry control scheme.

Turning to FIG. 11, a schematic diagram of an integrated closed-loop microstructure and geometry control scheme is shown. The system includes a MIMO controller architecture 1104 which includes a thermal-microstructure map 1101 which provides a set of desired thermal dynamic variables to an active auxiliary controller 1103 and a MIMO thermal-geometry controller 1102. The set of desired thermal dynamic variables are combined with real-time thermal dynamic variables from the real-time thermal dynamics monitoring scheme 800. Outputs from the indirect real-time microstructure/geometry scheme is combined with desired microstructure setpoints as an input to the MIMO controller architecture 1104. Outputs from the imaging system 6 are combined with desired geometry setpoints as an input to the MIMO controller architecture 1104. Another input to the MIMO controller architecture may be from the thermal microstructure dynamic model 1000.

An output of the MIMO controller 1102 is transmitted to the TMP process 13 while an output of the auxiliary controller 1103 may be transmitted to the auxiliary cooling or heating system. An output of the TMP process results in a controlled microstructure geometry.

As further shown in FIG. 11, the indirect real-time microstructure/geometry monitoring scheme 900 can be integrated with the imaging system 6 to obtain real-time feedback signals required for complete monitoring of microstructural and geometrical properties. However, since the thermal dynamics variables 43 are the measurable feedback signals, a thermal-microstructure map 1101 is used to convert the desired microstructure and the microstructure error to a desired thermal dynamic variable required to reach the desired microstructure. The thermal-microstructure map 1101 is a mapping that relates the process thermal dynamics to the output final microstructure. By knowing the thermal dynamics of a process, one can predict the developed microstructure using the process map or vice versa. The thermal process map can be in the form of but not limited to, a phase diagram, CCT diagram, CHT diagram, or a combination of these diagrams. Therefore, using the information provided by the thermal-microstructure map 1101, the desired set of thermal dynamics required to achieve the desired microstructure is obtained. The real-time thermal dynamic monitoring scheme 800, can be used to provide feedback signals of the thermal dynamics to calculate the real-time error of thermal dynamics signal. The error in thermal dynamics and geometry is fed into a multi-input, multi-output (MIMO) thermal-geometry controller 1102, to provide the required TMP process inputs to achieve a minimum error for the desired thermal dynamics and geometry. Therefore, by controlling the thermal dynamics in real-time, a controlled microstructure is also obtained.

Integrating the thermal-microstructure map 1101 with the MIMO thermal-geometry controller 1102 assists to construct the MIMO microstructure-geometry controller architecture 1101. The controller receives geometry and thermal dynamics variables errors and using a control algorithm including but not limited to, proportional integral derivative (PID), model predictive control (MPC), model identification adaptive control (MIAC), and model reference adaptive control (MRAC), calculates the process parameters including the process speed, heat power, and material feed rate. The final integrated closed-loop microstructure and geometry control scheme 1100 can be used to control integrated microstructural and geometrical properties of the TMP process in real-time. In the case of using predictive control techniques, the microstructure/geometry model derived in FIG. 10 can be used as the reference model. The MIMO microstructure-geometry controller architecture 1101 can also have different architectures or combinations, including but not limited to, integration with a feedforward controller for eliminating the effect of disturbance. In the case of using feedforward control techniques, the thermal-microstructure model 1000 derived in FIG. 10 can be used as the reference model for the feedforward controller.

Initially, thermal monitoring can be carried out during geometry control. In case the thermal dynamics were not consistent through geometry control, the thermal (or microstructure) controller is activated. However, depending on the primary goal of the controlling scheme, any of the microstructure or geometry controllers can act as the primary controller and the other controller can be utilized as the secondary controlling method. When both controllers are needed, the two controllers may be integrated and activated simultaneously to control microstructure and geometrical properties at the same time.

The cooling rate and heating rate of TMP processes are usually restricted to limited values due to the limitation of input process parameters and the process conditions. However, there exists applications for which specific cooling and heating rate values outside the limit are required to achieve certain microstructural properties. It is tough to control and obtain out-of-the-range thermal dynamic desired values using only the process inputs as control actions. Therefore, there exists the need of an active method of exciting or dampening the cooling and heating during the process to obtain and control certain thermal dynamic and desired microstructural/geometrical values.

In one embodiment, this may be achieved via the auxiliary cooling system 8 and the auxiliary heating system 9. These systems may be used to provide out-of-the-range cooling and heating rate values. For example, the cooling rate can be enhanced using an external supply of cooling (or shielding) gas such as from an auxiliary cooling system 8, or it can be decreased by splitting the heating source and providing secondary heating after the initial solidification as the auxiliary heating system 9. As shown in FIG. 11, these auxiliary systems can be controlled and adjusted in real-time using an optional active auxiliary controller 1103 to obtain out-of-the-range thermal dynamic values and actively control the thermal dynamics and microstructure/geometry through auxiliary cooling or heating of the TMP process.

LHT, or sometimes referred to as laser hardening is a TMP procedure which involves applying a laser as a heat source to improve surface qualities such as hardness, strength, wear resistance, and fatigue life of a component. LHT produces thin layers on the surface that are heated and cooled rapidly, resulting in very fine microstructures, even in steels with very low hardenability. Since LHT is a TMP process, the indirect real-time microstructure/geometry monitoring scheme 900 and integrated closed-loop microstructure and geometry control scheme 1100 described above can be used to indirectly monitor and control the local hardness and the hardening depth of the LHT process in real-time.

In a specific embodiment, for experimental purposes, an LHT process was developed based on the system of FIG. 1, without the imaging system 6, material feeding system 4, auxiliary cooling system 8, and auxiliary heating system 9. A multi-axes CNC machine (5-axis Fadal VMC 3016) is used as the motion system 2, a high power laser (1.1 kW IPG fiber laser YLR-1000-IC) is used as the heat source 3, argon is used as the shielding gas supply 5, and an infrared Jenoptik IR-TCM 384 camera module is used as the thermal monitoring system 7.

In the experiment, AISI 1020 low carbon steel is used for laser heat treatment. The dimensions of the AISI 1020 substrates were 100×30×6.35 mm. Before the LHT process, all of the substrates were rinsed with ethanol and washed with acetone to remove any contamination. Each set of single-track LHT samples were performed on separate substrates with a line spacing of 6 mm between each treated area. As will be understood, the initial temperature and amount of preheat in all laser heat treated samples and claddings influence the microstructure formation. To ensure the initial temperature and preheat of each laser line was the same, after each track on the substrate, the substrate was quenched by washing acetone for 10 s and air dried to reach the initial room temperature.

Thermal dynamics and thus, material and mechanical properties in an LHT process are governed by the process inputs of the system. Therefore, two sets of experiments A and B were prepared by changing process inputs such as the travelling speed and laser power to evaluate their effects on the thermal properties, and consequently on the hardened depth and amount of hardening of AISI 1020 low carbon steel. The processing parameters of the A and B-samples are shown in Table 1. It should be noted that each sample is a single-track LHT process with a scanning length of 90 mm to reach a stable thermal profile.

TABLE 1

Laser processing parameters of single-track LHT A and B-samples with beam diameter (D = 2 mm)

| Sample No. | Laser power (W) | Travelling Speed (mm/min) |
|---|---|---|
| A100 | 250 | 100 |
| A300 | 250 | 300 |
| A400 | 250 | 400 |
| A500 | 250 | 500 |
| A600 | 250 | 600 |
| A700 | 250 | 700 |
| A800 | 250 | 800 |
| B175 | 175 | 500 |
| B200 | 200 | 500 |
| B225 | 225 | 500 |
| B250 | 250 | 500 |
| B275 | 275 | 500 |
| B300 | 300 | 500 |
| B400 | 400 | 500 |

One of the experiments was used to determine the effect of travelling speed on thermal dynamics, microstructural and geometrical properties.

Figure 12:
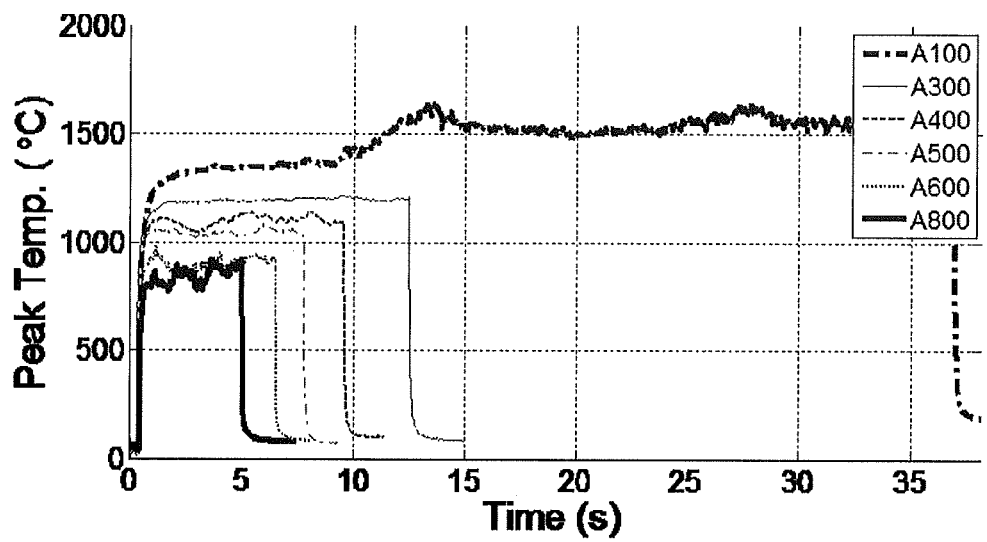
FIG. 12 is a graph outlining real-time peak temperature of the A-samples with constant power (250 W) and changing travelling speed.
Figure 13:
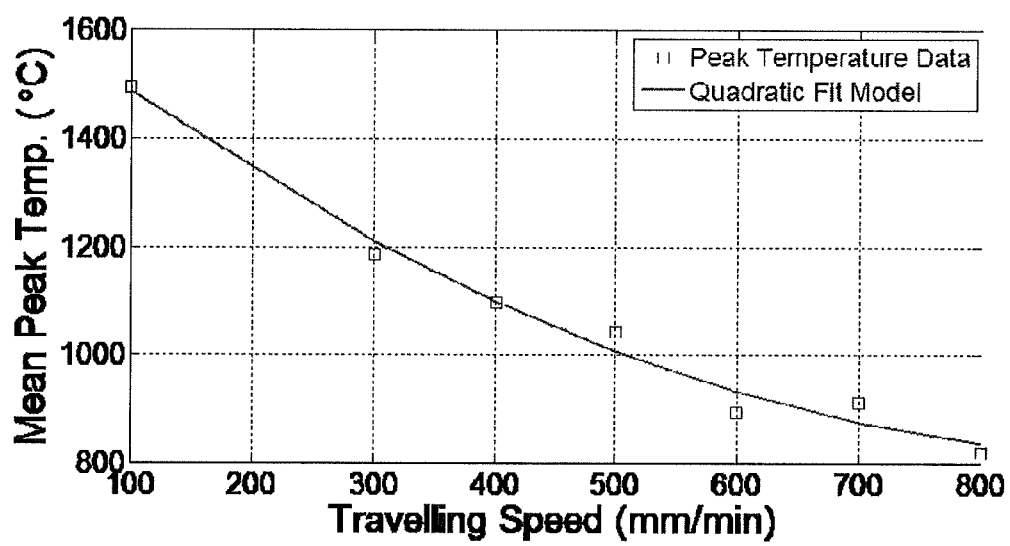
FIG. 13 is a graph outlining mean peak temperature of the A-samples with respect to the travelling speed and constant power at 250 W.
Figure 14:
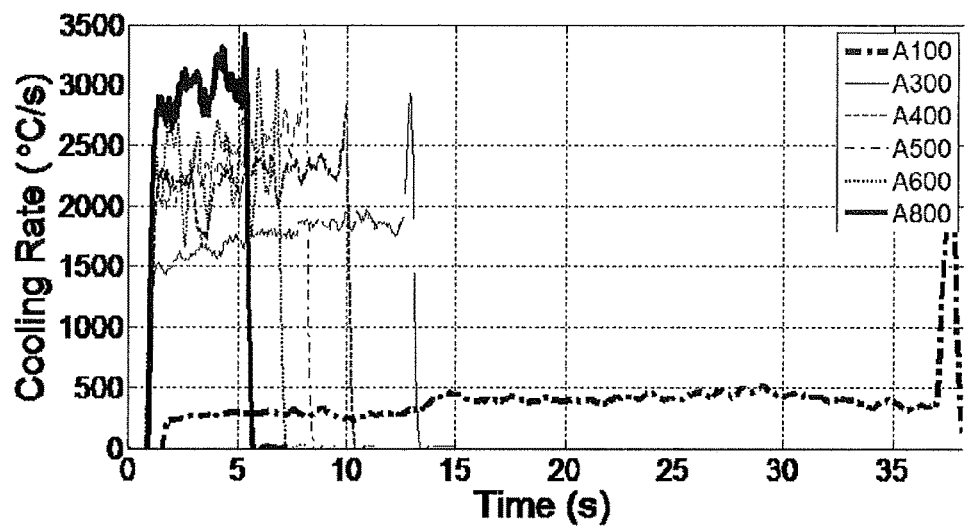
FIG. 14 is a graph outlining real-time cooling rate of the A-samples with constant power (250 W) and changing travelling speed.
Figure 15:
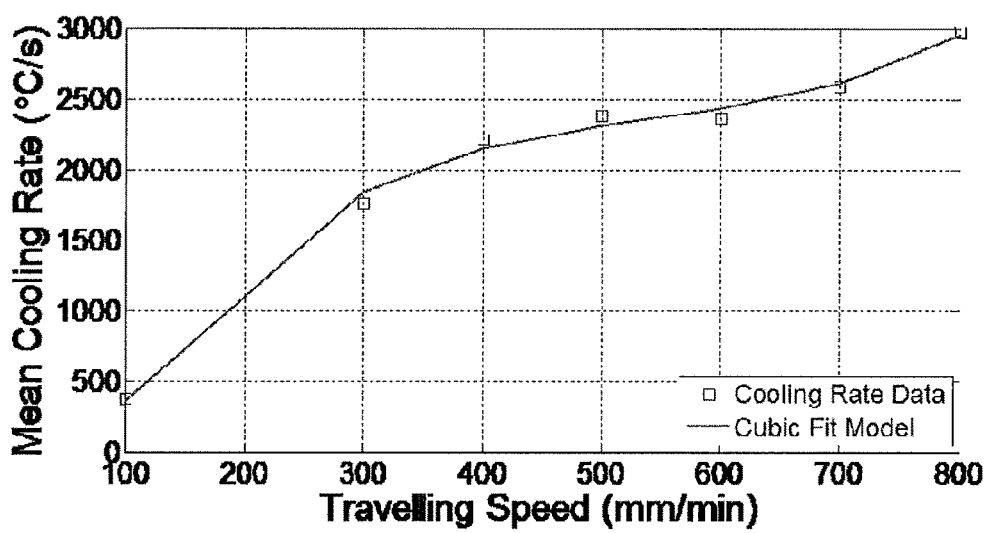
FIG. 15 is a graph outlining mean cooling rate of the A-samples with respect to the travelling speed and constant power at 250 W.

During experimentation, real-time thermal dynamics variables 43 were measured using the real-time thermal dynamic monitoring scheme 800 with the infrared Jenoptik IR-TCM 384 camera module 7. The real-time cooling rate of the A-samples are shown in the graph of FIG. 14. In order to remove or eliminate the effects of noise and have a comparative study of each cooling curve, mean values of each curve at their stable regions are plotted in FIG. 15. According to FIG. 15, the cooling rate increases with the increasing traveling speed in a cubic manner ($C \propto V^3$). The real-time peak temperature measurements of the A-samples and the mean peak temperatures with respect to the travelling speed are shown in FIG. 12 and FIG. 13, respectively. As will be understood, the number after the letter A in the legend represents the travelling speed in $$\frac{mm}{min}.$$

Figure 16:
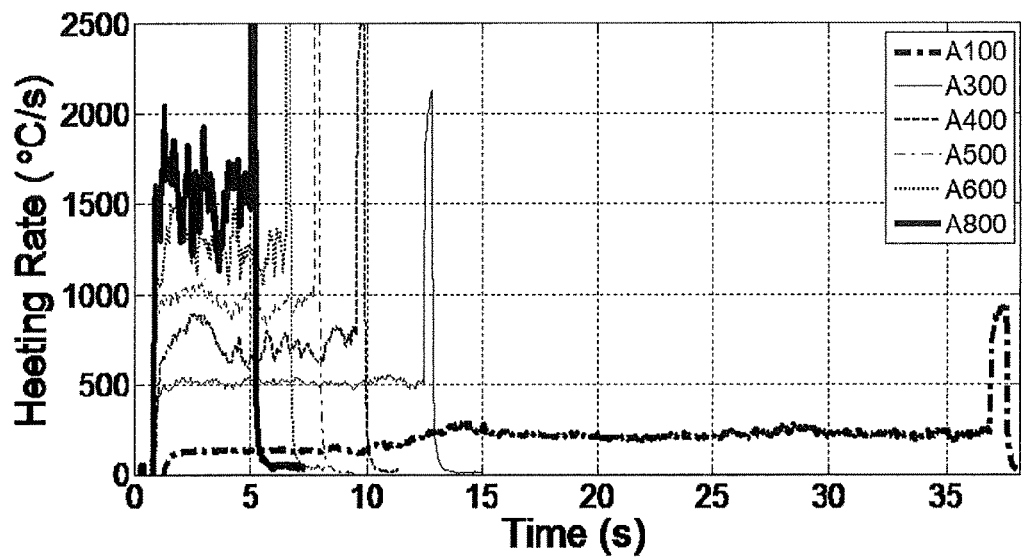
FIG. 16 is a graph outlining real-time heating rate of the A-samples with constant power (250 W) and changing travelling speed.
Figure 17:
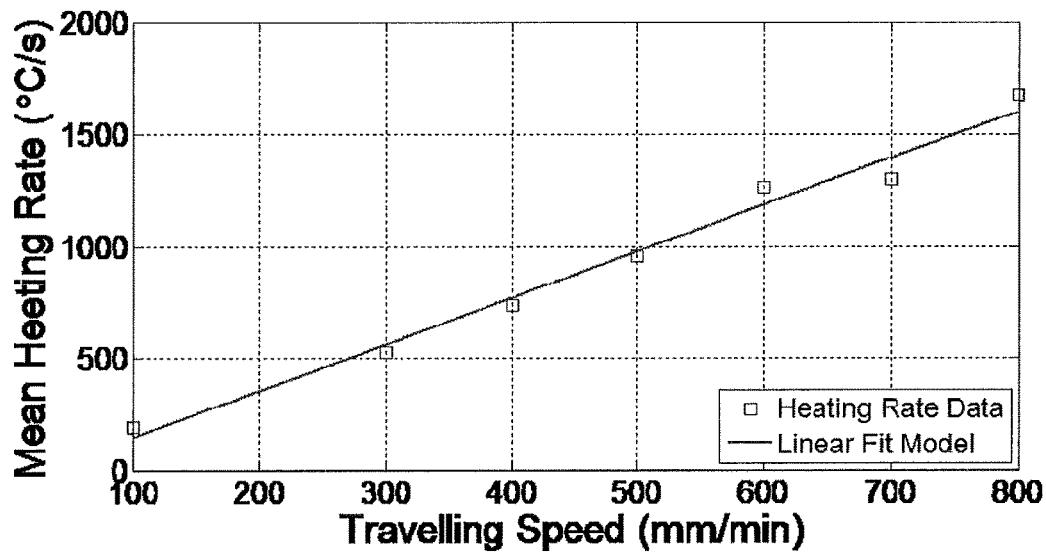
FIG. 17 is a graph outlining mean heating rate of the A-samples with respect to the travelling speed and constant power at 250 W.

In contrast to the cooling rate, the peak temperature decreases with increasing travel speed quadratically ($T_m \propto -V^2$). FIG. 16 illustrates the real-time heating rate of the A-samples. The mean values of the heating rate with respect to the travelling speed are shown in FIG. 17. As can be seen, the heating rate has a more linear ($H \propto V$) relationship with travel speed. Although, observations were obtained in terms of the effect of travelling speed on the thermal history, the correlation of microstructure and geometry with these thermal dynamics and obtaining the microstructure model 901 and geometry model 902 assist in the development of an indirect real-time microstructure/geometry monitoring scheme 900 and integrated closed-loop microstructure and geometry control scheme 1100 for the LHT process.

High magnification (500×) micrographs of the different A-samples are shown in FIGS. 18a to 18g. The base metal was composed of pearlite in a matrix of ferrite and $Fe_3C$ (light regions). The dark regions of the heat affected zone (HAZ) correspond to untransformed pearlite, whereas, the light regions are mainly composed of ferrite. On the other hand, the dark regions in the hardened surface correspond to martensite due to their high hardness values (489 HV0.01), whereas, the lighter regions are partially transformed martensite. Partial martensite transformation may be promoted here by the nonuniform distribution of carbon in the austenite, due to nonhomogenized austenization of the rapid heating and cooling.

Figure 18A:
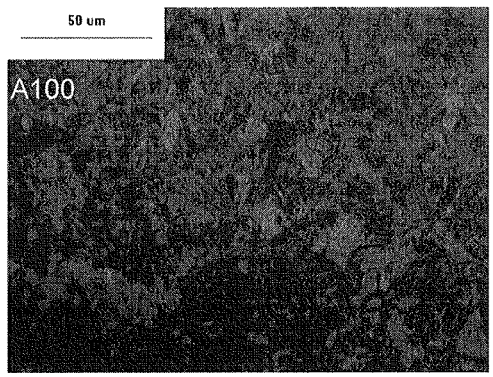
FIGS. 18a to 18g are high magnification (500×) micrographs of the A-samples.
Figure 18B:
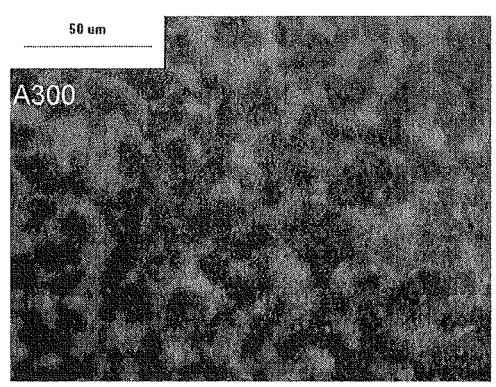
Figure 18C:
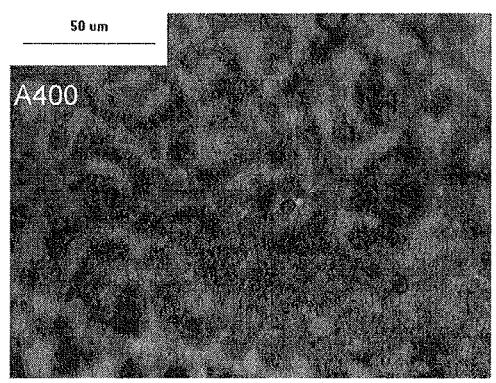
Figure 18D:
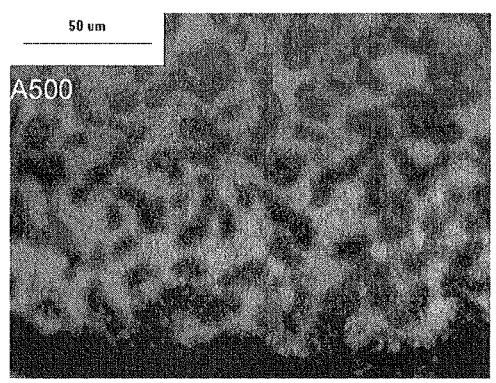
Figure 18E:
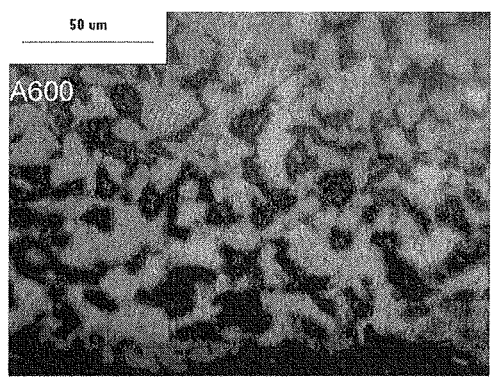
Figure 18F:
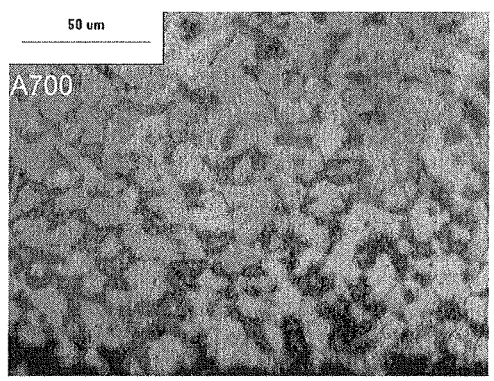
Figure 18G:
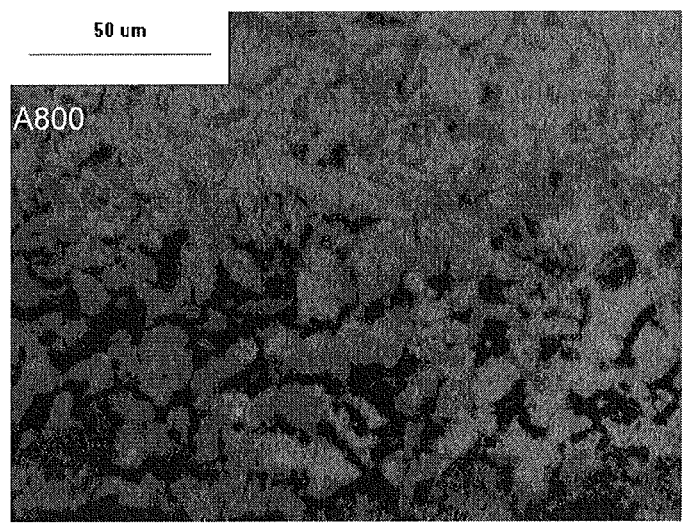

A fully martensitic morphology is observed in the A100 specimen in FIG. 18a, as a result of the rapid cooling. Since the rest of the samples have higher cooling rates compared to A100, a fully martensitic structure is also expected according to CCT diagrams. However, it is observed that from samples A300 to A800 the fully martensitic structure changes to a two micro constituent structure of martensite and ferrite grains. This unexpected reduction of martensite at high cooling rates is a consequence of the rapid heating. Looking at CHT diagrams, it is observed that as the heating rate increases during the heating process, higher peak temperatures are required for a homogenous austenization. Whereas, the increased heating rates from samples A300 to A800 are associated with a reduction of peak temperature because of increased traveling speeds. As a result, there is insufficient austenite formed during the heating stage to transform into martensite, no matter how high the cooling rate is. Therefore, a high cooling rate at the cooling stage does not always produce the expected phases and hardness values predicted in a CCT diagram due to the highly non-equilibrium conditions imparted by the rapid thermal cycle. On the other hand, the kinetics of the heating rate and peak temperature during the heating stage also define the final microstructure and its hardness. Therefore, real-time thermal dynamics variables 43 in the LHT process can be obtained using the real-time thermal dynamic monitoring scheme 800 and these variables can be utilized to indirectly monitor the martensite formation with the real-time microstructure/geometry monitoring scheme 900 based on the peak temperature and cooling rate signals. Comparing the indirect microstructure monitoring outputs with CCT and/or CHT diagrams in real-time, one can predict the evolving microstructure during the process.

Although, the peak temperature for all of the A-samples in FIG. 13 is above the austenization temperature, the very high heating rates and low peak temperatures achieved in samples A300-A800 resulted in a non-homogenized austenization. This incomplete austenization process also explains the formation of partially transformed martensite in the hardened regions of the A-samples. Hence, the reduction of the martensitic region through samples A100-A800 could be interpreted and correlated to a combination of real-time cooling rate, peak temperature and heating rate data provided by the IR-camera.

Another experiment was performed to determine the effect of laser power on thermal cycle, microstructural and geometrical properties. These set of experiments were performed using the system embodiments discussed earlier to provide information of how the system interacts with the LAM procedure and also provide some basic knowledge for the development of different thermal-microstructure model 1000 for the LAM procedure.

Figure 19:
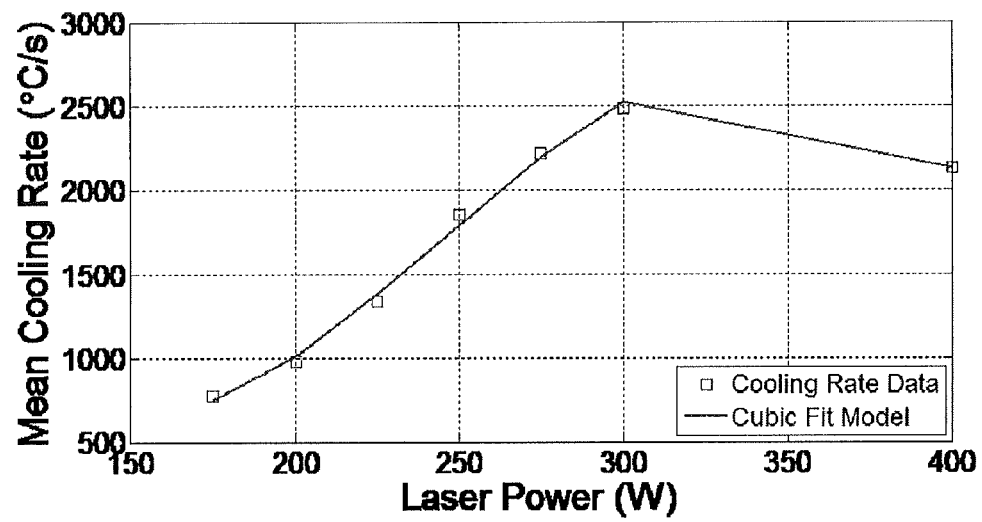
FIG. 19 is a graph outlining mean cooling rate of the B-samples with respect to the laser power with constant travelling speed at 500 mm/min.
Figure 20:
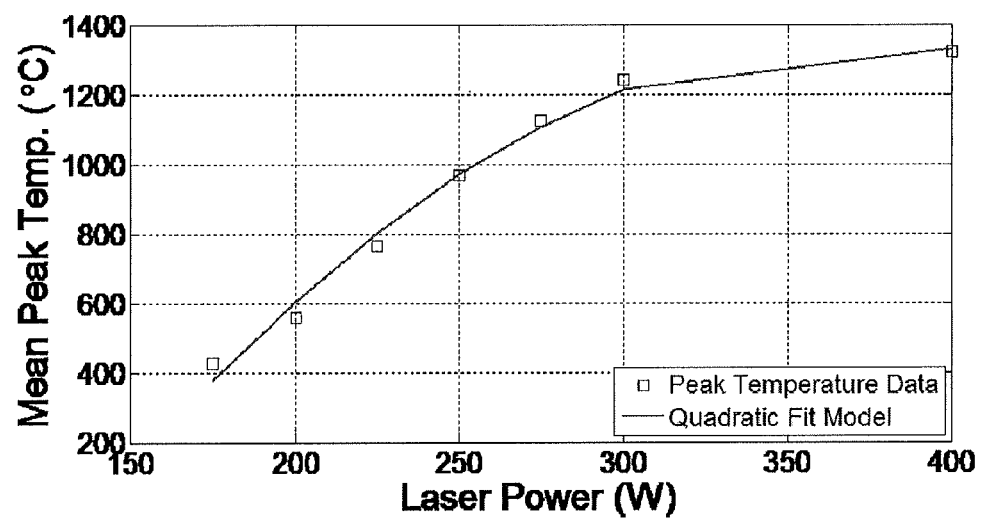
FIG. 20 is a graph outlining mean peak temperature of the B-samples with respect to the laser power with constant travelling speed at 500 mm/min.
Figure 21:
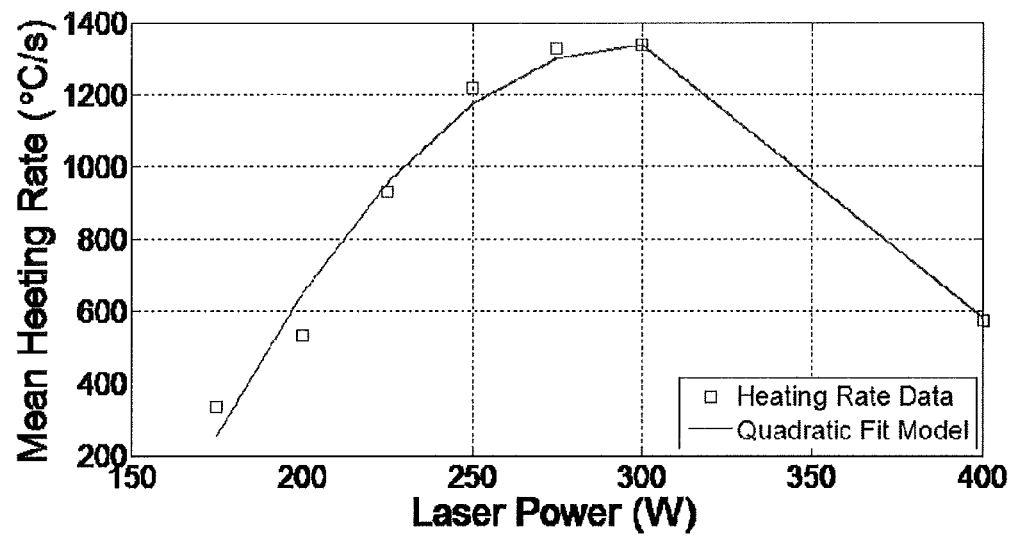
FIG. 21 is a graph outlining mean heating rate of the B-samples with respect to the laser power with constant travelling speed at 500 mm/min.

The B-samples were also designed to show the effect of the laser power on thermal dynamics of the LHT process. FIGS. 19 to 21 illustrate the mean cooling rate, peak temperature and heating rate of the B-samples, respectively. The measurements reflect that as the laser power increases in these samples, the cooling rate increases up to 300 W and then suddenly reduces afterwards. Such a cooling reduction can be better understood by considering a similar heating rate trend in FIG. 21, in which there is a sudden reduction of the heating rate at 300 W. This behavior may be due to a change in the laser absorption coefficient at melting since, the peak temperature for this sample is very close to the melting temperature (see FIG. 20). Such unpredictable changes of the laser absorption coefficient could only be compensated for through real-time monitoring of the thermal profile. The peak temperature on the other hand, has a more uniform trend; increasing with the laser power. It can be noted that a cubic ($C \propto P^3$) model best describes the cooling rate-laser power relation, whereas, a quadratic model ($T_m \propto P^2$ and $H \propto P^2$) best describe both the peak temperature and heating rate variations with laser power. This information can be used as the basis of developing the adaptive thermal model 1001 for obtaining the thermal-microstructure model 1000 for predicting the microstructure.

Micrographs of the B-samples were also investigated. It was observed that only samples B250-B400 produced a hardened region and samples B175-B225 did not have enough energy to penetrate into the substrate. Similar to the micrographs shown in FIGS. 18a to 18g, sample B400, which has the highest peak temperature had a fully martensitic microstructure, whereas, from samples B300 to B250 martensite regions are reduced. Similar to the A-samples, the reduction of the martensite regions from B300 to B250 could be anticipated based on non-homogenized austenization as a result of high heating rates and a low peak temperature.

Figure 22:
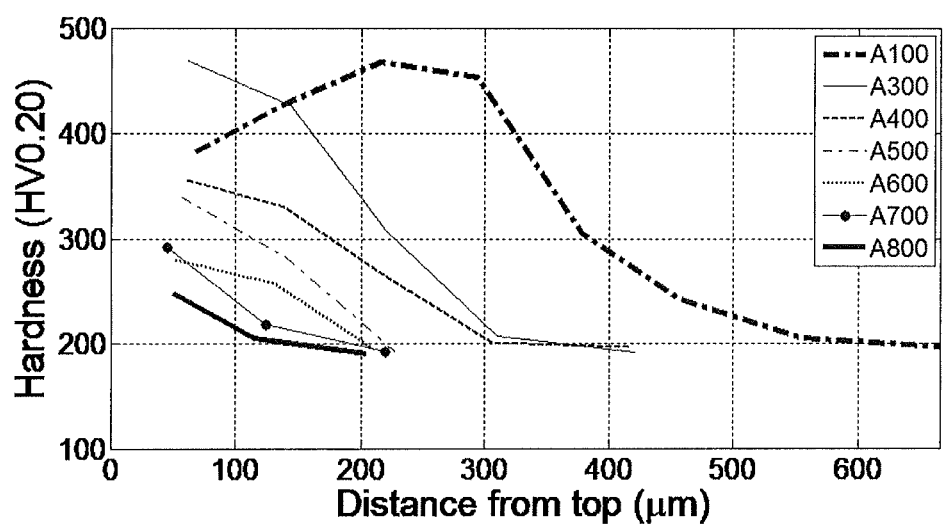
FIG. 22 is a graph outlining hardness of the A-samples with constant laser power (250 W) and changing travelling speed.
Figure 23:
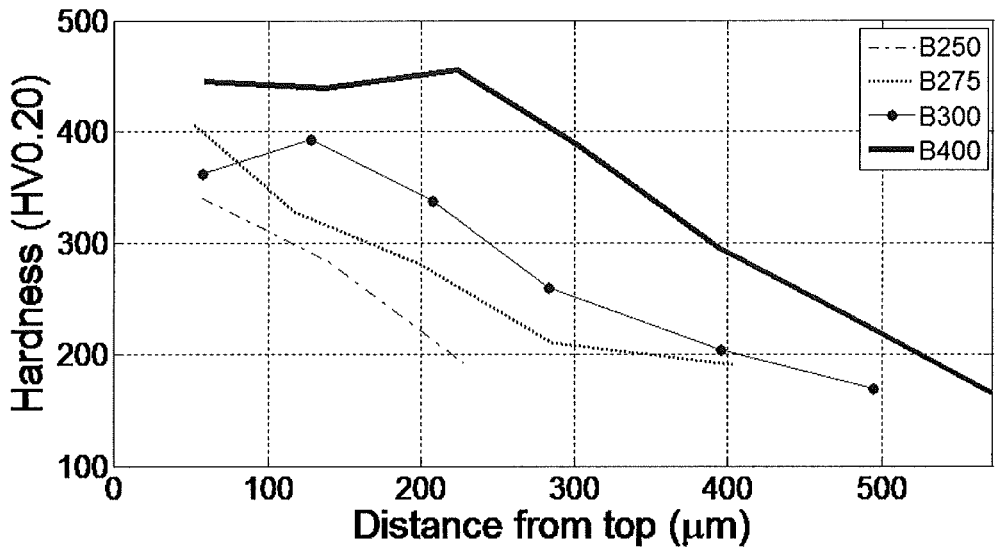
FIG. 23 is a graph outlining hardness of the B-samples with constant travelling speed 500 mm/min and changing laser power.

A further experiment was performed to determine the effect of thermal profile on hardness. The microstructure of a hardened surface determines the final hardness in an LHT process. To further evaluate hardness changes with respect to the correlation between microstructure and thermal history, microhardness measurements of the A and B-samples are shown in FIGS. 22 and 23, respectively. In both cases, the hardness increases as the amount of martensite regions increase, while softening occurs at very high cooling and heating rates, resulting in less martensite formation. As will be understood, the number after the letter B indicates the laser power in W. However, sample A100, which has the highest peak temperature has a lower amount of hardening immediately at the surface compared to the lower points of the hardened region. The peak temperatures in sample A100 ($T_{A100} \approx 1500°$ C.) are very close to the liquidus temperature of AISI 1020, causing partial melting at the top surface and a corresponding reduction in hardness. By comparing thermal dynamics of the A300 and B300 samples, it is understood that the peak temperature of the two samples are the same $T_{A300} \approx T_{B300} \approx 1200°$ C., however, the cooling and heating rates of A300 are much lower compared to B300; $C_{A300}(\approx 1750°$ C./s$) < C_{B300}(\approx 2500°$ C./s$)$ and $H_{A300}(\approx 500°$ C./s$) < H_{B300}(\approx 1350°$ C./s$)$. Since the cooling and heating rates of A300 are lower, the austenization is more extensive and homogenous, which allows for more material to transform to martensite, and produce a higher hardness value. Therefore, it may be seen that no single parameter plays a defining role during the LHT process. On the other hand, all of the three thermal dynamics variables (cooling rate, peak temperature and heating rate) are effective and should be monitored and controlled simultaneously to produce a desired hardness values.

Figure 24:
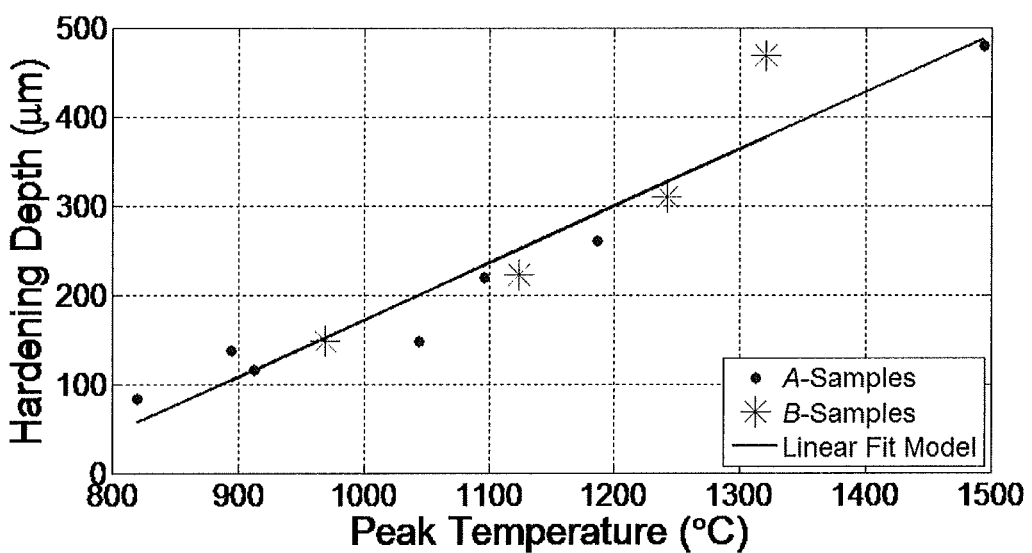
FIG. 24 is a graph outlining hardening depth of the A and B-samples with respect to their peak temperature.

Yet a further experiment was performed to determine the effect of thermal dynamics on hardening depth. One of the more important geometrical characteristics of an LHT process is the hardening depth. Direct measurement of the hardening depth through CCD-based imagery is impossible, however, indirect hardening depth monitoring through real-time thermal dynamic signals and using the indirect real-time microstructure/geometry monitoring scheme 900 is possible. The hardening depths of the A and B-samples were measured and plotted against their peak temperature values such as shown in FIG. 24. As can be seen, the hardening depth measurements included the HAZ height as well. It can be see that the peak temperature has a direct correlation with the hardening depth. In fact, the hardening depth has a linear relation with the peak temperature, which is a key insight for the development of a closed-loop controller for the hardening depth. In other words, monitoring and control of the peak temperature through thermal imaging can provide an indirect control of the hardening depth.

The indirect real-time microstructure/geometry monitoring scheme 900 was applied for the first time to correlate cooling rate, peak temperature and heating rate with microstructures, hardening depth, and hardness of a steel surface which underwent austenization and martensite formation during the LHT process. Increased cooling rates resulted in reduced martensite formation, in contrast to what is suggested by CCT diagrams. There was a high level or maximum limit for the heating rate and cooling rate to reduce or prevent non-homogenized austenization and partial martensite formation, and it is suggested these limits can be defined, monitored and controlled by a real-time thermal acquisition system. In addition to the martensite formation, the real-time thermal history also governed the hardness profile of each track. It was also observed that the hardened depth had a positive correlation with the peak temperature, which can be used as a feedback control signal during closed-loop hardening depth control.

The relations between the thermal dynamics and the martensite formation, hardness and hardening depth, can be integrated into the microstructure/geometry model 903 to develop an indirect real-time monitoring scheme 900 for these properties. As a result, the indirect real-time microstructure/geometry monitoring scheme 900 and integrated closed-loop microstructure and geometry control scheme 1100 were found to be applicable in real-time monitoring and closed-loop control of the martensite formation, hardness and hardening depth during the LHT process.

Laser additive manufacturing (LAM) with injected powder melting is another TMP process, which implies layer by layer shaping of materials in the form of powder to arbitrary configurations and geometries, using a comprehensive integration of materials science, mechanical and control engineering, and laser technology. The LAM technology uses a high power laser as the energy, or heat, source. The technology is currently used in manufacturing and repair, cladding, design of novel alloys or functionally graded materials (FGM), and metallic rapid prototyping. Despite being a promising manufacturing technology, it is beneficial to understand and control the material behavior during the LAM process to be capable of producing functional parts for industries such as aerospace, energy and/or automotive. The indirect real-time microstructure/geometry monitoring scheme 900 and integrated closed-loop microstructure and geometry control scheme 1100, described above can be used to indirectly monitor and control the local deposition microstructure during the LAM process in real-time.

This was performed, or confirmed via an experiment. The LAM process developed for this experiment is schematically represented by the setup shown in FIG. 1, without the imaging system 6, auxiliary cooling system 8, and auxiliary heating system 9. In the current embodiment, a multi-axes CNC machine (5-axis Fadal VMC 3016) is used as the motion system 2, a high power laser (1.1 kW IPG fiber laser YLR-1000-IC) is used as the heat source 3, a powder feeder with two 1.5 L hoppers (Sulzer Metco TWIN 10-C) is used as the material feeding system 4, argon is used as the shielding gas supply 5, and an infrared Jenoptik IR-TCM 384 camera module is used as the thermal monitoring system 7.

The deposition powder used for the C-samples is stainless steel (SS) 316L powder. The SS 316L powder had a composition of 0.003 wt % C, 17 wt % Cr, 65.5 wt % Fe, 1 wt % MN, 3 wt % Mo, 13 wt % Ni, less than 0.005 wt %, 0.01 wt % S and 0.45 wt % Si. All experiments conducted used AISI 1030 medium carbon steel substrates with a composition of: 0.28-0.34 wt % C, 0.6-0.9 wt % Mn, less than 0.04 wt % P, and less than 0.05 wt % S. Specimens were sectioned in the longitudinal direction for microstructural examination. Samples were prepared using SiC grit paper with grit mesh sizes from 240 to 1200, polished with 1 μm alumina powder and auto polished with 1 to 0.5 μm diamond paste. After each polishing step, the samples were placed in an ultrasonic machine to remove contamination and later air dried. Stainless steel samples were etched in Marble's reagent (10 g $CuSO_4$ in 50 mL HCl and 50 mL $H_2O$), to expose grain structure and morphology. The microstructures were analyzed using optical microscopy with images obtained from an Olympus AH microscope with objective magnifications of up to 50×. All of the height and dilution measurements were also conducted by the Olympus AH microscope.

The parameters of the C-samples are shown in Table 2, in which the travelling speed of the laser increases gradually from sample C1 to C4. These samples were designed to study the effect of the travelling speed on the cooling rate and consequent effect of the cooling on microstructural properties such as hardness and grain size of deposition.

TABLE 2

Laser processing parameters of B samples for studying the effects of cooling rate on microstructure, and effects of travelling speed on cooling rate.

| Sample No. | Laser power (W) | Travel Speed (mm/min) | Powder Feed Rate (g/min) | Effective Energy (J/mm²) | Powder Deposition Density (g/min) |
|---|---|---|---|---|---|
| C1 | 700 | 25 | 4.0 | 672 | 0.064 |
| C2 |  | 50 |  | 336 | 0.032 |
| C3 |  | 100 |  | 168 | 0.016 |
| C4 |  | 200 |  | 84 | 0.008 |

The effective energy E measures the amount of energy delivered to the process by the laser. This energy is principally responsible for melting the substrate surface and powder, and is defined by $$E = \frac{P}{VD},$$

in which P is the laser power (W), V is the traveling speed of the substrate (mm/s), and D is the laser beam diameter (mm). The effective energy E is measured in units of $$\frac{J}{mm^2}.$$

The powder deposition density PDD is also a good indicator of the amount of powder fed to a unit area of the substrate during deposition. The powder deposition density is defined by $$PDD = \frac{R}{VD}$$

where R is the powder feed rate. The powder deposition density PDD is measured in units of $$\frac{g}{mm^2}.$$

To further study the effects of thermal dynamics of the LAM process on hardness of the deposition, a horizontal layer of AISI 4340 deposition was built by overlapping three single-track deposits with a specific overlap percentage. The processing parameters of the D-samples are listed in Table 3.

TABLE 3

Laser processing parameters of multi-track LAM D-samples with beam diameter D = 2 mm and powder feed rate F = 6 g/min.

| Sample No. | Laser power (W) | Travelling Speed (mm/min) | Overlap (%) |
|---|---|---|---|
| D100 | 800 | 100 | 25 |
| D150 | 800 | 150 | 25 |
| D200 | 800 | 200 | 25 |

Through experimentation, a test was performed to determine the effect of real-time cooling rate on LAM microstructure was tested. These tests are focused on the application of the real-time thermal dynamic monitoring scheme 800. Moreover, the recorded information can be integrated into the thermal-microstructure model 1000 to provide a model for hardness in multi-track LAM depositions.

Real-time thermal dynamics 43 were measured using the real-time thermal dynamic monitoring scheme 800 with the infrared Jenoptik IR-TCM 384 camera module 7. It is noted that since LAM is a solidification process, the peak temperature is equivalent to melt pool temperature.

Figure 25:
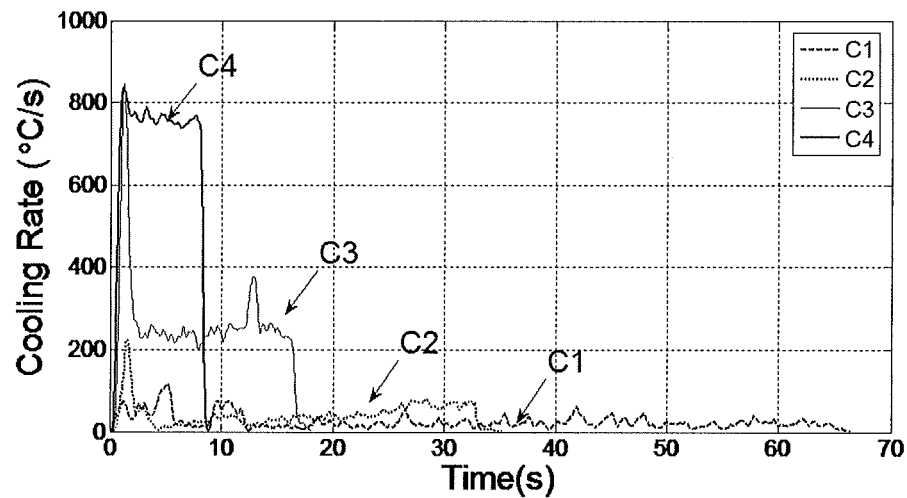
FIG. 25 is a graph outlining cooling rate of C samples.
Figure 26:
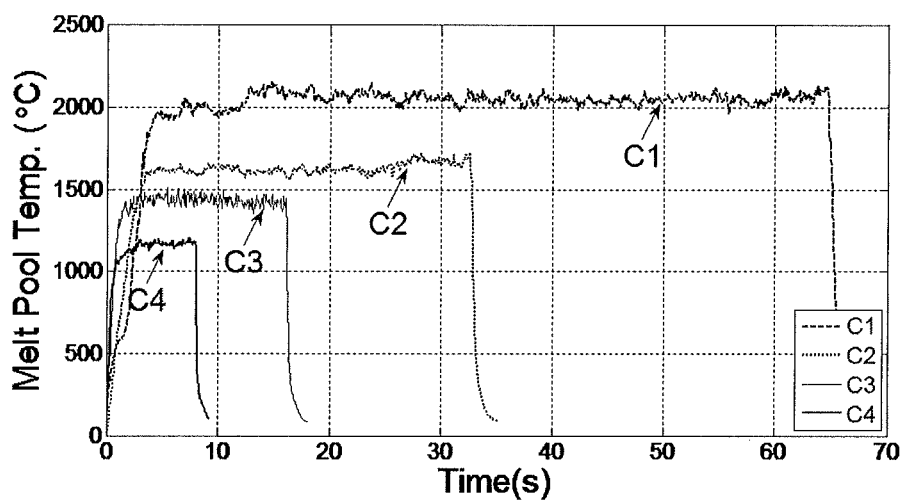
FIG. 26 is a graph outlining melt pool temperature of C samples.
Figure 27A:
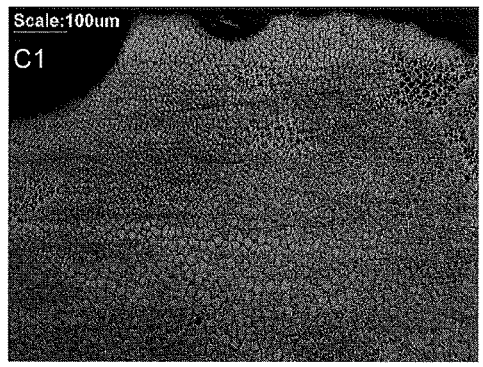
FIGS. 27a to 27d are low magnification micrographs of C samples.
Figure 27B:
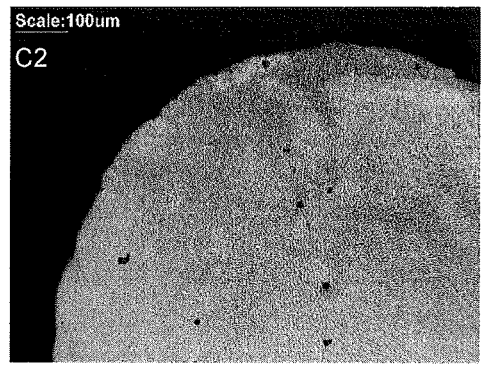
Figure 27C:
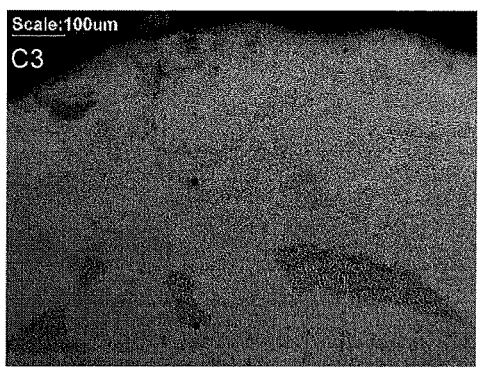
Figure 27D:
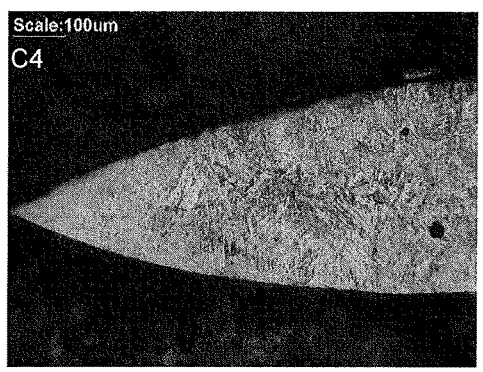
Figure 28A:
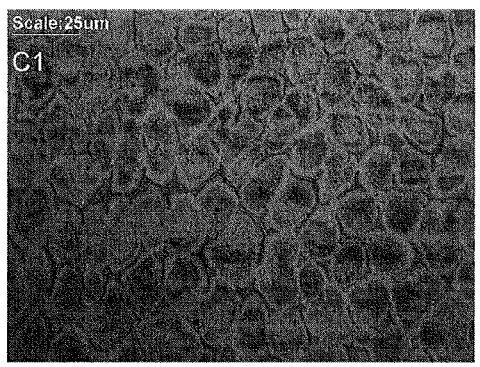
FIGS. 28a to 28d are high magnification micrographs of C samples.
Figure 28B:
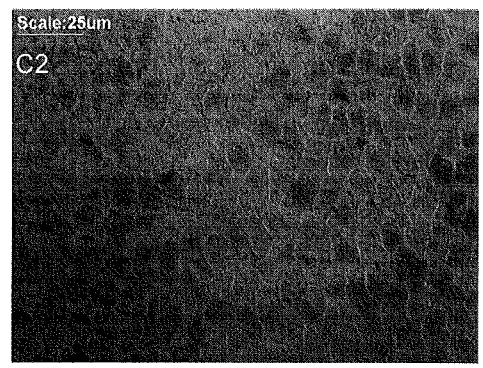
Figure 28C:
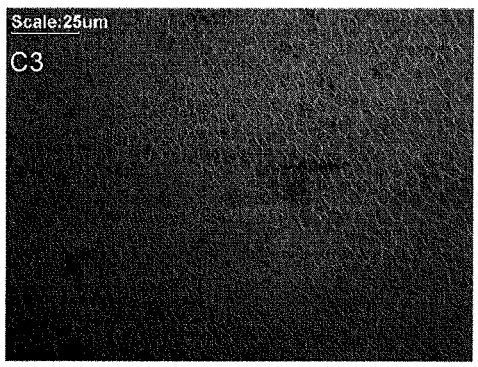
Figure 28D:

Cooling rate and melt pool temperatures of the C samples are presented in FIG. 25 and FIG. 26, respectively. It can be seen from these figures that as the speed increases, the cooling rate increases dramatically, whereas the melt pool temperature decreases. Although, the cooling rate and melt pool temperature are both affected by the speed change, the changes in the cooling rate are more significant. More interestingly, cooling rate measurements reveal that as the effective energy (E) drops (see Table 2) from sample C1 to C4, the cooling rate increases. On the other hand, although, the decrease in E should result in a decrease in the melt pool temperature, an increasing trend is observed for the melt pool temperature. This increase of melt pool temperature is due to the decreasing powder deposition density (PDD) (see Table 2), which indicates less amount of mass to be heated up. Therefore, it is observed that the effective energy (E) is positively correlated with the cooling rate, whereas, it is the powder deposition density (PDD) that defines the melt pool temperature.

In order to compare cooling rate and melt pool temperature variations in more detail, the average cooling rate and melt pool temperature values of the stable regions in each of the C samples are listed in Table 4. FIG. 27 provides low magnification micrographs of the C samples. Sample C1 has a greater height compared to the other samples, hence, only top of the sample C1 clad is shown.

TABLE 4

Mean cooling rate and melt pool temperatures C samples for studying cooling rate effects on microstructural evolutions.

| Sample No. | Mean Cooling Rate $\left(\frac{°C.}{s}\right)$ | Mean Melt Pool Temperature (° C.) |
|---|---|---|
| C1 | 22 | 2053 |
| C2 | 39 | 1630 |
| C3 | 248 | 1434 |
| C4 | 764 | 1153 |

Microstructures of the SS 316L depositions in FIG. 27 typically include two regions: (1) light regions, which represent the γ-austenite phase, and (2) dark regions, which represent the δ-ferrite phase. According to Table 4 and the micrographs shown in FIG. 27, as the cooling rate decreases from C1 to C3 the ferrite content of the deposition decreases likewise. The increased cooling rate in C3 and to some extent in C2, reduces the chances of δ-ferrite formation. Since the (γ+δ+L) and (γ+δ) inter-phases are formed at very narrow temperature ranges, high cooling rates will reduce the total time of transitions in which δ-ferrite is formed. Thus, at high cooling rates less time is allocated for the formation of the δ-ferrite phase, resulting in a primary uniform austenite phase with cellular and dendritic austenitic substructures.

Surprisingly, C4 has a higher content of ferrite compared to C2 and C3, although having a much greater cooling rate. Moreover, compared to the cellular microstructure of samples C1-C3, sample C4 has a needle-like microstructure. This type of microstructure and the very high cooling rate $$\left(C = 764 \frac{°C.}{s}\right)$$

are signs of martensite formation during solidification. To verify whether sample C4 is martensite or not, micro hardness tests were taken from these samples. Table 5 shows the micro hardness of the C samples, which were measured at similar locations on top of the clad cross sections. It is clear that C4 has a much greater hardness compared to the other three samples, and values >350 HV are indications that martensite is present. Since martensite has a higher hardness compared to austenite, the higher hardness in sample C4 indicates that the primary phase in this sample is martensite opposed to austenite in samples C4. Since C4 has a very high cooling rate $$\left(C = 764 \frac{°C.}{s}\right),$$

the austenite is quenched to the unstable phase martensite, which is not present in the other samples. Thus, the significance of cooling rate on the primary phase of solidification is once again justified. Furthermore, as a consequence of the high cooling rate, C4 has a higher dilution. Therefore, due to the higher geometrical dilution of the mild steel substrate, martensite is produced.

TABLE 5

Micro hardness results of C samples.

| Sample No. | Hardness (HV1.00) | Mean Cooling Rate $\left(\frac{°C.}{s}\right)$ |
|---|---|---|
| C1 | 150.5 | 22 |
| C2 | 150.5 | 39 |
| C3 | 153.3 | 248 |
| C4 | 368.0 | 764 |

The experiments were also used to determine Grain Size Variation with Real-time Cooling Rate. To better illustrate grain size variations in the microstructure, a higher magnification micrograph of the C samples are presented in FIG. 28. There is significant correlation between the grain size and real-time cooling rate. According to FIG. 27 and FIG. 28, with a successive increase of the cooling rate, grain boundaries shrink drastically. Consequently, C1, which has the lowest cooling rate, yields the largest grain size, and C4, which has the highest cooling rate, has very fine grain structures.

The ASTM grain size number of each C sample is listed in Table 6. For each sample, three fields were measured. The subsequent grains per unit area ($N_A$) and average grain diameter ($\bar{d}$) of each grain size number were also obtained using the tables provided in ASTM standard E 112 from the experimentally measured G-ASTM grain size number.

TABLE 6

Grain size number of the C samples with changing speed.

| Sample No. | G-ASTM Grain Size (No.) | NA-Grains/Unit Area $\left(\frac{No.}{mm^2} \text{ at } 1\times\right)$ | d-Average Grain Diameter (μm) |
|---|---|---|---|
| C1 | 9 | 3968.0 | 15.9 |
| C2 | 10 | 7936.0 | 11.2 |
| C3 | 12 | 31744.1 | 5.6 |

The results show that the number of grains per unit increases with the cooling rate. On the other hand, the grain diameter decrease with the increasing cooling. However, more measurements at different cooling rates are required to establish an analytic relation between the cooling rate and the grain size. Generally, the cooling rate has direct effect on: (1) the volumetric percentage of austenite and ferrite phases inside the microstructure, (2) formation and growth of these phases, and (3) grain boundaries and grain size.

Figure 29:
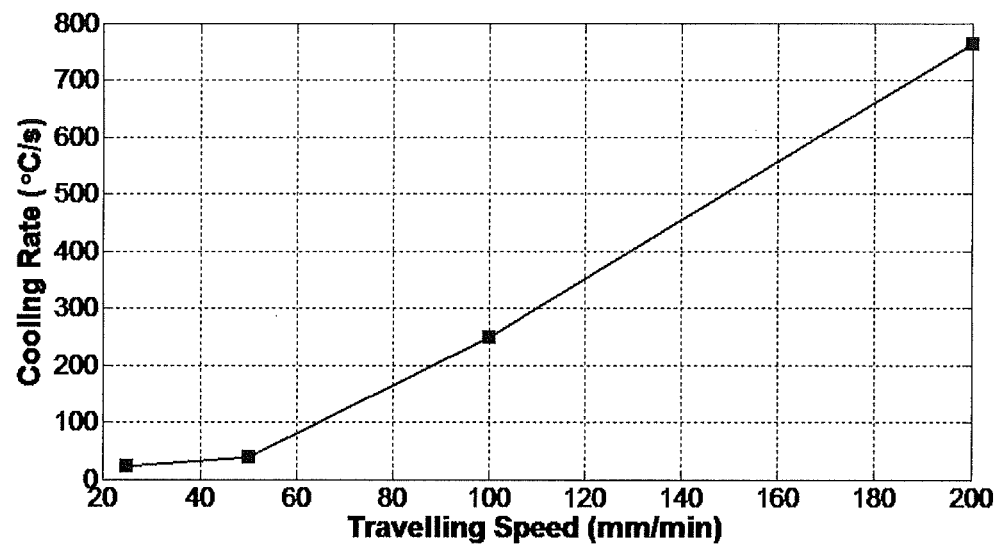
FIG. 29 is a graph showing the effect of traveling speed on cooling rate for C samples.

It was realized that cooling rate variations resulted in microstructural evolutions, however, the source of these variations and the effects of speed on the cooling rate were not discussed. It is quite revealing to combine the input and output data of the LAM process in Table 2 and Table 4. In the C samples only the travelling speed is changing, with a constant laser power and powder feed rate. The cooling rate and melt pool temperature are illustrated as a function of the traveling speed in FIG. 29 and FIG. 30, respectively.

Figure 30:
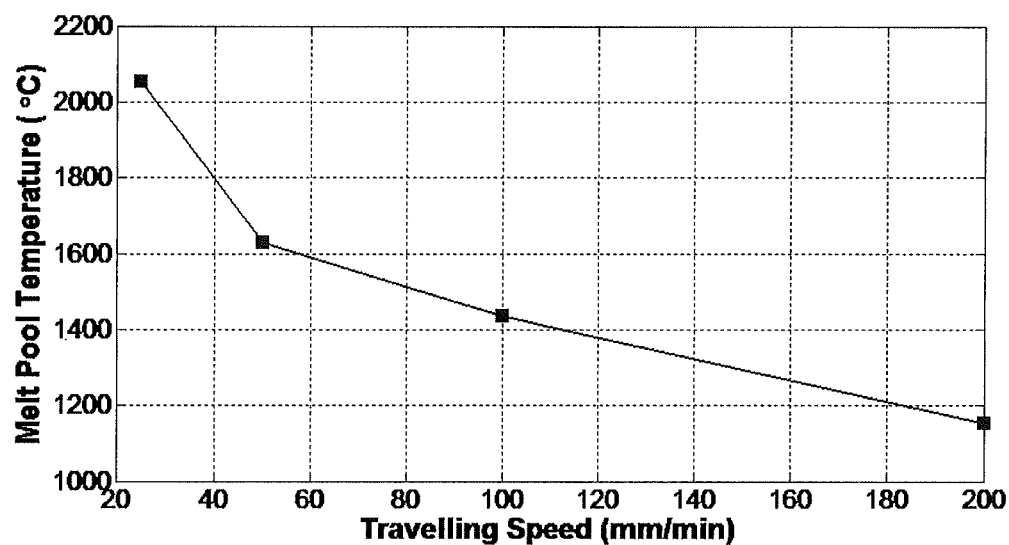
FIG. 30 is a graph showing the effect of traveling speed on melt pool temperature for C samples.

The increasing speed has created an increasing trend for cooling rate and a decreasing trend for the melt pool temperature. Apparently, the traveling speed has a linear relation with the cooling rate and melt pool temperature, if the data from the C1 sample were to be neglected. In FIG. 30 the cooling rate is nearly doubled by doubling the traveling speed. The traveling speed directly affects the cooling rate and hence indirectly affects the clad microstructure. Taken together, these results suggest that real time cooling rate control may be used to tailor the microstructure changes by varying laser power and traveling speed.

Further experiments were performed to determine the effect of thermal dynamics on hardness.

Figure 31:
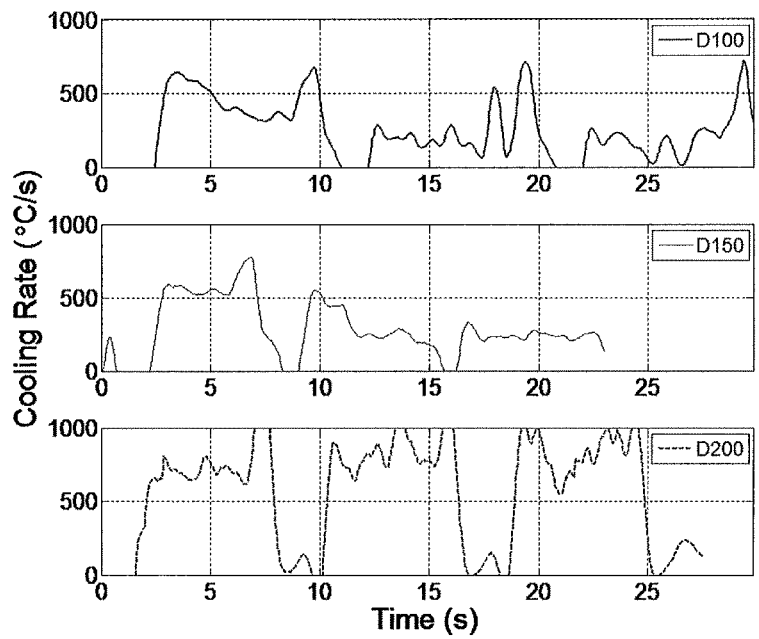
FIG. 31 is a set of graphs showing real-time cooling rate of the multi-track D-samples (25% overlap) with constant power (800 W) and changing travelling speed.
Figure 32:
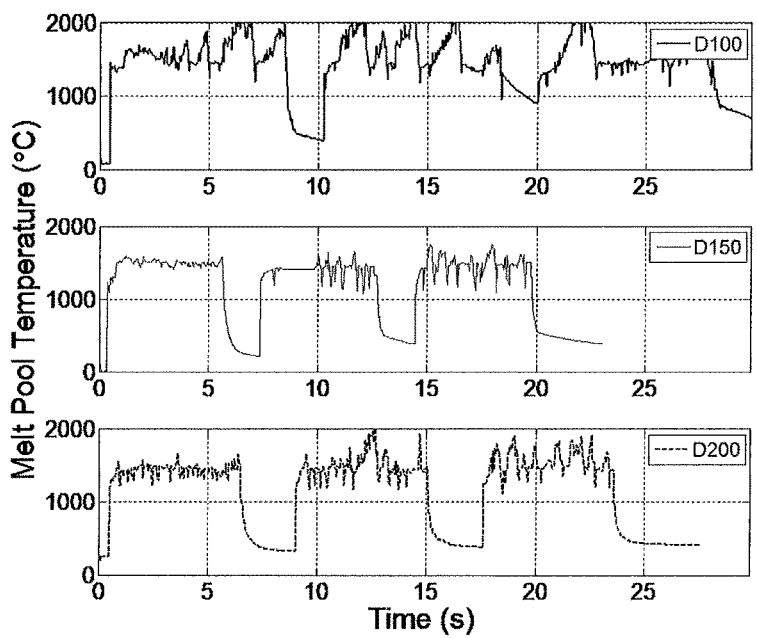
FIG. 32 is a set graphs showing real-time melt pool temperature of the multi-track D-samples (25% overlap) with constant power (800 W) and changing travelling speed.

The multi-track D-samples were designed to study hardness variation of multi-track laser additive manufacturing based on thermal dynamics. The real-time cooling rate and melt pool temperature of the D-samples are shown in FIG. 31 and FIG. 32, respectively with the number after the letter D indicating the travelling speed in mm/min. Each of the three bumps in the recordings indicates the thermal history of each of the three tracks during the deposition of every D-sample. It is interesting the melt pool temperature of the three tracks of each sample does not change significantly. On the other hand, for samples D100 and D150 that have a lower speed compared to D200, the cooling rate drops in the second and third tracks as a result of the preheating caused by prior depositions. Moreover, at the time of deposition of the second or third tracks the previous tracks will act as a heat sink, increasing the directions of the heat flow and reducing the cooling. In D200 however, since the travelling speed and cooling rate are higher there is not enough heat accumulated in the substrate to reduce the cooling of the later tracks.

The hardness of each track in every D-sample is listed in Table 7. The second and third tracks in samples D100 and D150, which had a lower cooling rate compared to the first track have higher hardness. The hardness reduction is due to tempering of the first track caused by the later track depositions. However, in sample D200 all of the three tracks have nearly the same hardness, which is in positive correlation with their similar cooling rate history. Therefore, the hardness of multi-track LAM depositions is in great correlation with the cooling history of each line during depositions, whereas, the melt pool temperature recordings of the lines do not provide any information on the hardness variations. Further evaluation of the cooling rate effect on multi-track LAM process is required to generalize the current conclusion, however, the current cooling rate-hardness correlations could provide a basis for the development of a closed-loop hardness control in LAM based on cooling rate control.

TABLE 7

Hardness of each track in the multi-track LAM depositions of the D-samples.

| Sample No. | Track No. 1 (HV0.20) | Track No. 2 (HV0.20) | Track No. 3 (HV0.20) |
|---|---|---|---|
| D100 | 450 | 583 | 545 |
| D150 | 400 | 465 | 520 |
| D200 | 410 | 475 | 430 |

The LAM thermal monitoring experiments showed promising results for understanding and controlling microstructure and hardness of LAM products. During the single-track depositions, the morphology transitioned from a cellular microstructure at low cooling rates to equiaxed dendrites at high cooling rate. Microstructural analysis proved that both the size of the solidification structure and mode of solidification can be defined by the real-time cooling rate. The hardness of single-track depositions was also in positive correlation with the cooling rate as opposed to the melt pool temperature. Multi-track LAM experiments also showed that the hardness of each track can be predicted through real-time monitoring of the cooling rate.

The relations between the thermal dynamics and the morphology of deposition, grain size and hardness, can be integrated into the microstructure/geometry model 903 to develop an indirect real-time monitoring scheme 900 for these properties. As a result, the indirect real-time microstructure/geometry monitoring scheme 900 and integrated closed-loop microstructure and geometry control scheme 1100 of the disclosure were found to be applicable in real-time monitoring and closed-loop control of the microstructural phases, grain size and hardness during the LAM process. For example, when fabricating a component produced by LAM usually a specific amount of desired grain size and/or hardness is required for the component layers. The grain size and hardness information shown in Table 6 and Table 7, respectively, can be correlated with the recorded thermal dynamics variables such as the change in cooling rate of each track to construct an indirect real-time monitoring scheme 900 and also a thermal-microstructure model 1000 for grain size monitoring and identification. The indirect monitoring can then be implemented as a feedback signal inside the integrated closed-loop microstructure and geometry control scheme 1100 to control the cooling rate in order to obtain desired values for the grain size of the LAM deposition. A controller may be used as the thermal-geometry controller 1102 to control the cooling rate, using the identified thermal-microstructure map 1001 as the reference model. Same procedure can be applied for the LHT process when surface heat treating a component and desired hardness is required.

In a further embodiment, the disclosure is directed at real-time closed-loop control of microstructure during laser additive manufacturing. The melt pool temperature and the cooling rate are the two intermediate process outputs, which will be used as feedback signals to control the microstructure in this embodiment. Monitoring and processing the two signals can be achieved with real-time thermal dynamic monitoring scheme 800. To obtain a desired microstructure during the LAM process, it is beneficial to control the cooling rate and the melt pool temperature in real-time using the indirect real-time microstructure/geometry monitoring scheme 900 and integrated closed-loop microstructure and geometry control scheme 1100 of the disclosure. A controller is responsible for acquiring these data and interpreting the required control actions to promote the desired material properties and microstructures. The LAM output process microstructure is measured using the indirect real-time microstructure/geometry monitoring scheme 900 and fed back to the controller 1101 in real-time, to provide closed-loop control of the microstructure 1100.

Many current systems have attributed microstructural evolutions to cooling rate variations rather than the melt pool temperature. In this disclosure, a PID controller is designed to control the cooling rate in a closed-loop process based on real-time data of the IR images in order to achieve a controlled microstructure through closed-loop control of the cooling rate.

In one aspect of controller design, since the LAM process is a complex nonlinear system, preliminary experiments were first conducted to understand which of the process variables should be used as the control action. The outcomes of these experiments are described below and provide a good choice for the control action. Initial experiments were conducted to evaluate the effect of laser travelling speed, laser power and powder feed rate on the cooling rate. Results indicated that the travelling speed had a more critical effect on the cooling rate value. Hence, to simplify the problem, the travelling speed was used as a single controlling action to stabilize the cooling rate to a desired value. All other affecting parameters such as the laser power and powder federate were not controlled in real-time. A PID controller was then designed and developed accordingly.

Figure 33A:
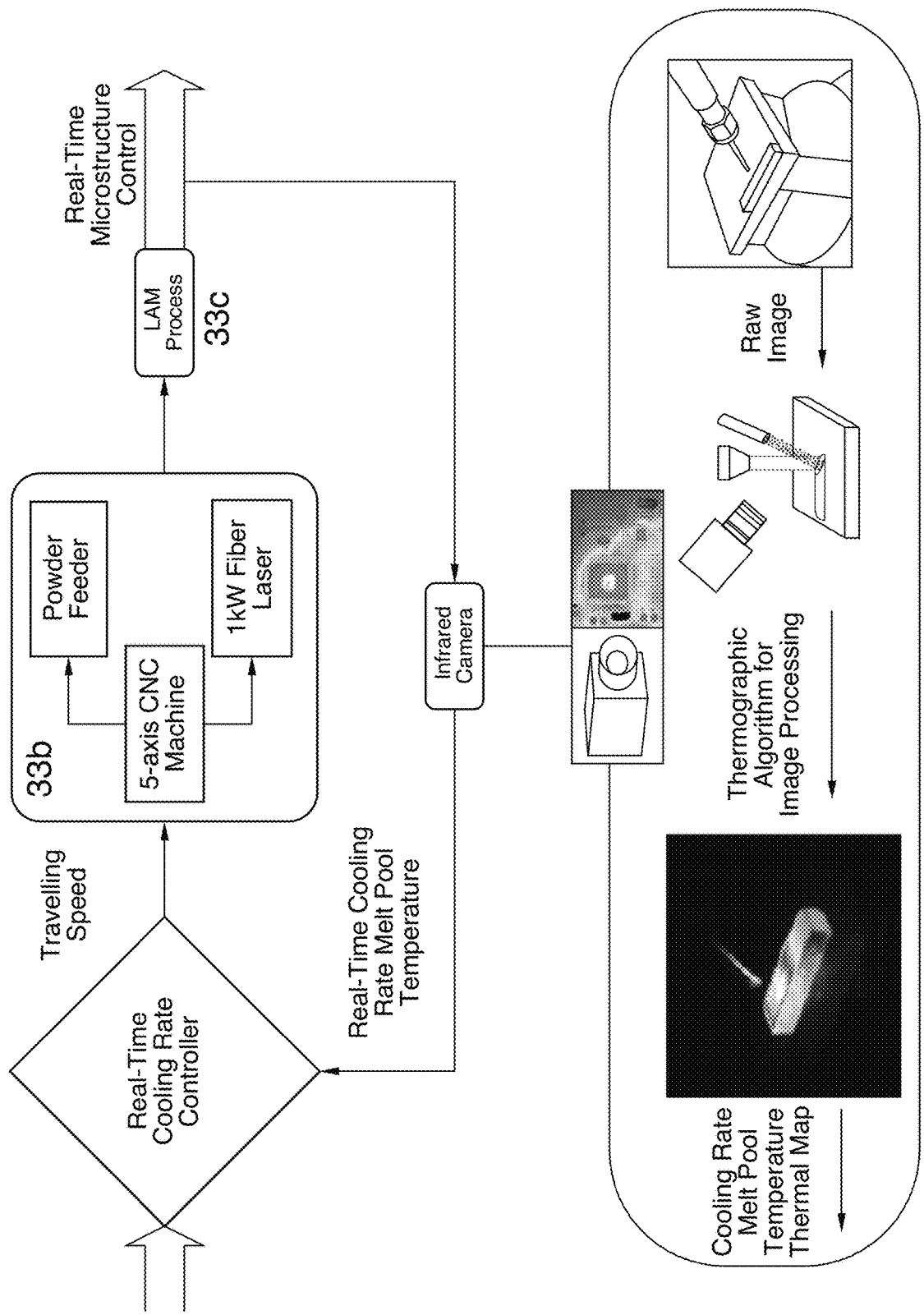
FIG. 33a is a schematic diagram of an embodiment of a real-time microstructure controller.
Figure 33B:
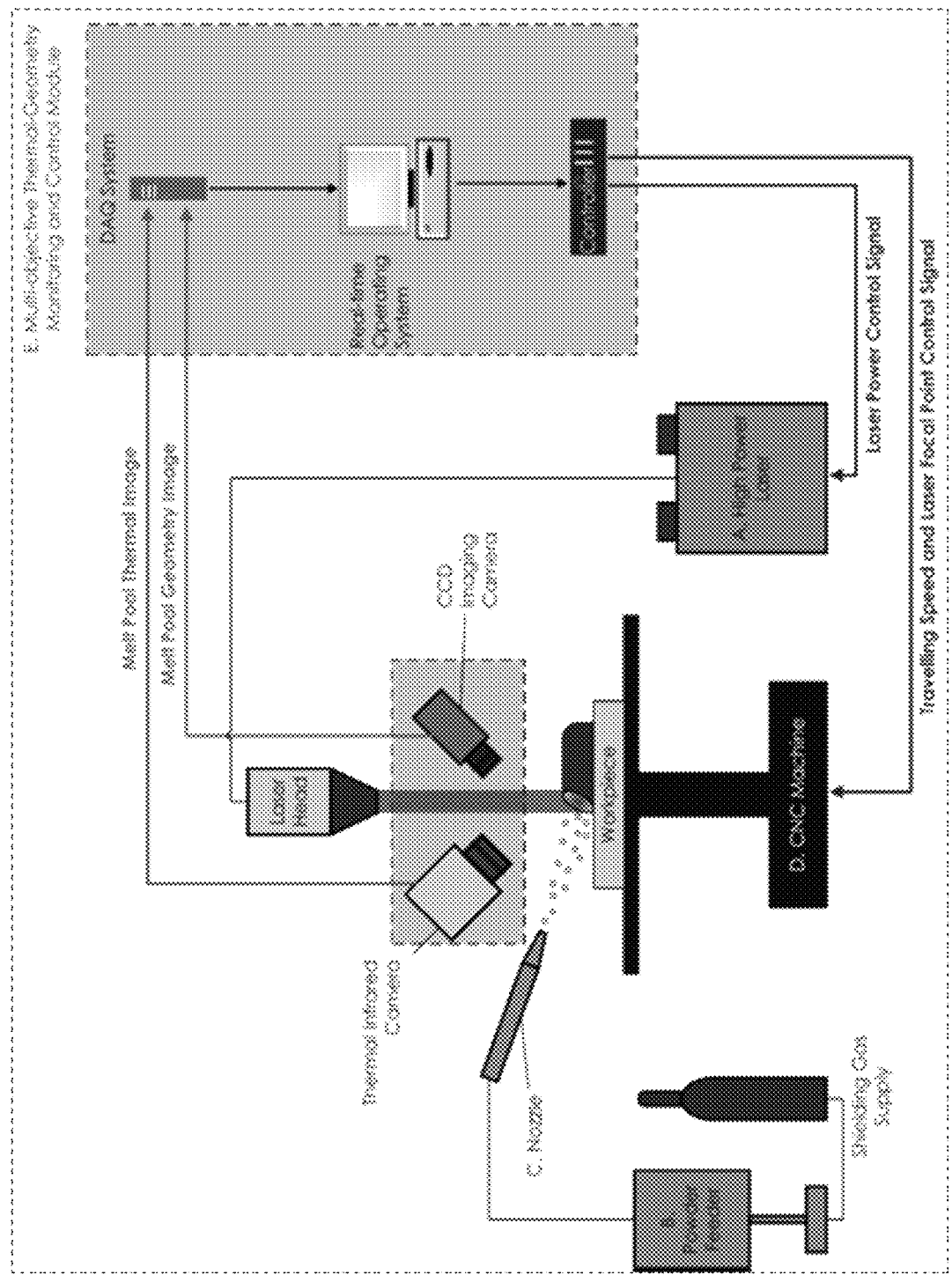
Figure 33C:
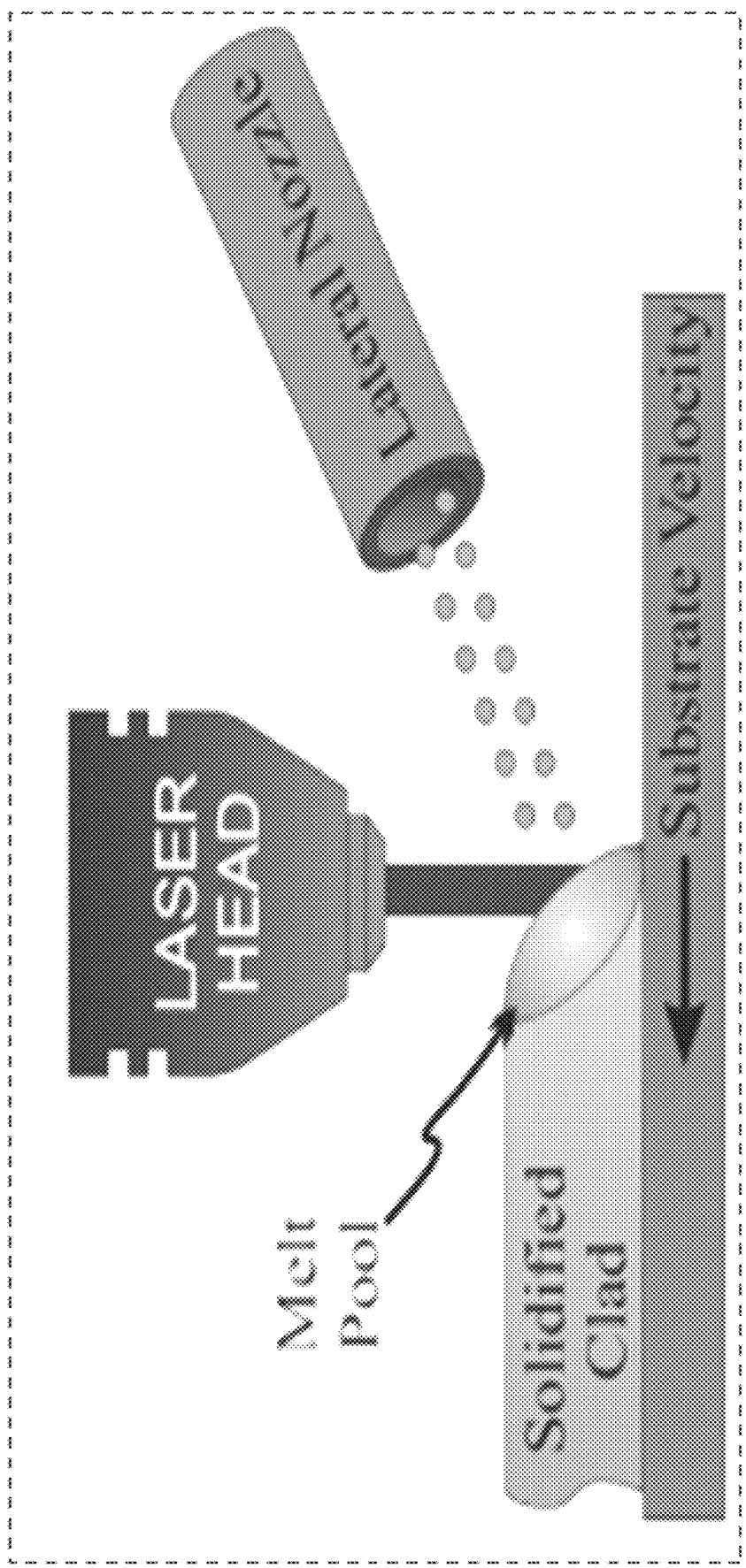

Finally, integrated closed-loop microstructure and geometry control scheme 1100 was used to control the microstructure in real-time during the LAM process. A block diagram of the approach is presented in FIG. 33a. Real-time cooling rate and melt pool temperature values are extracted with real-time thermal dynamic monitoring scheme 800. The target is to control output microstructural variations based on cooling rate changes during the process. The developed closed-loop control system measures the cooling rate in real-time and feeds it to a real-time cooling rate controller. The controller then feeds in the required traveling speed to reach the desired cooling rate. A controlled microstructure is expected through a controlled cooling rate at the end of the LAM process.

Based on the results certain conclusions were made. In the following, the experimental design, implementation and performance of the closed-loop PID controller for controlling the microstructure in real-time during the LAM process are discussed. As stated earlier, the traveling speed is used as the control action to control the cooling rate and thus, the deposition microstructure in real-time.

Figure 34:
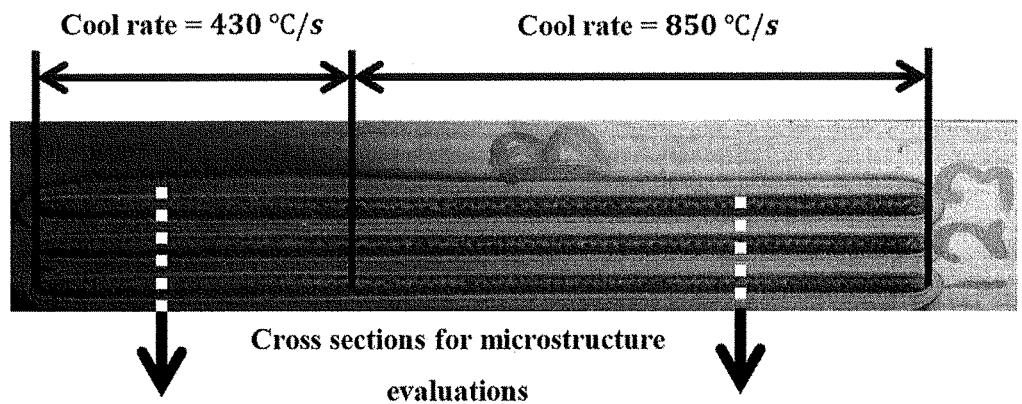
FIG. 34 is a diagram showing multi-track claddings for evaluation of the microstructure controller for G sample.

With respect to microstructure control in a multi-track cladding under thermal disturbances, a multi-track deposition test was prepared to evaluate the performance of the developed real-time microstructure controller. As shown in FIG. 34, three clad lines were deposited consecutively without any cooling in between. The length of each line is 90 mm, and the lines have a 5 mm distance between them. Thus, as each line is deposited, a certain amount of preheat is produced in the substrate, disturbing the initial thermal conditions of the system for the next deposition. Moreover, instead of having a constant set-point, a stair case set-point was assigned to the controller. The initial set-point for the first half of each line is 430° C./s, and then the closed-loop controller has to reach a set-point of 850° C./s. Therefore, the controller's performance is evaluated by introducing two disturbances: 1) preheat and 2) changing set point.

Several samples were cladded by the closed-loop process with the same conditions as in FIG. 34. A set of G samples were analyzed for further evaluation of cooling rate and microstructure control. Due to the great nonlinearities of the system a new set of PID gains were required for each set-point. However, it was intended to tune a single set of PID gains for the multi-track staircase set-point for the G sample, though this was difficult to achieve and required greater attention. The optimum set of PID gains tuned for the multi-track claddings with a staircase set-point (850° C./s and 430° C./s) are listed in Table 8.

TABLE 8

Optimal PID gains for multi-track cladding with step set point.

| Staircase Set-point Cooling | $K_C$ | $T_I\left(\dfrac{1}{K_I}\right)$ | $T_D$ |
|---|---|---|---|
| G (850° C/s and 430° C/s) | 4 | 0.002 | 0 |

Figure 35:
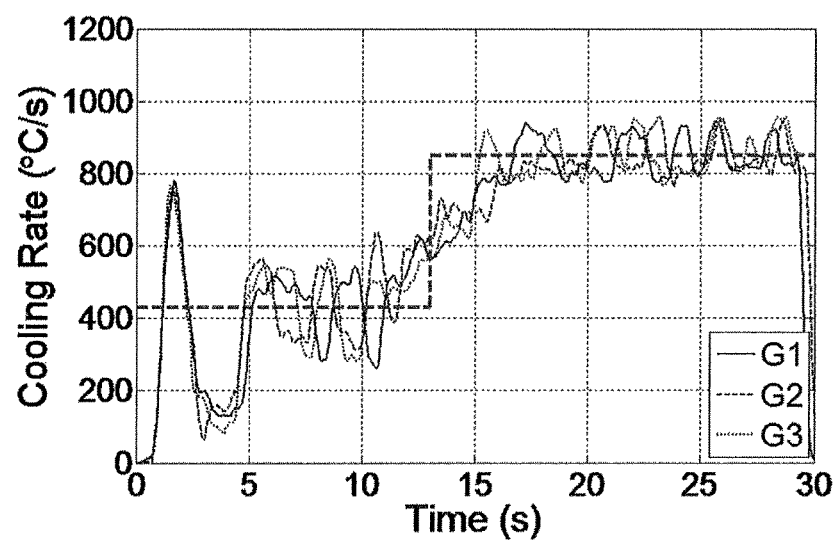
FIG. 35 is a graph of a closed-loop response of cooling rate for three repeated claddings which transition from 430 to 850° C./s cooling rates.

The closed-loop response of the cooling rate for the G samples are illustrated in FIG. 35. The number (n=1, 2 and 3) after the sample number (i.e. Gn) indicates the deposition line (shown in FIG. 34) in each sample. There are overshoots at the beginning of the cooling rate signal, which is attributed to the nature of the real-time cooling rate measurement system. As stated above since a certain amount of delay (in this case $(n\tau)_G$=0.9375 s) is required for the calculation of the cooling rate (temperature reduction) using the thermal dynamic algorithm 700, the system requires 0.9375 s to measure the first cooling point. It can be observed in FIG. 35, after nearly 0.9375 s the overshoot is damped since the system measurements of the cooling are correct, whereas, before this time the system measurements are unreliable and incorrect. Moreover, the initial oscillations and slow convergence of the system is attributed to the absence of a $T_D$ gain. Unfortunately, after a $T_D$ gain was inserted into the system, although, convergence was faster, the system became unstable.

The controller is successful in achieving the desired set-points; however, there are oscillations around the initial set-point 430° C./s. Since 430° C./s is lower than 850° C./s, the oscillations are mainly considered to be noise of the measurement device due to low pixel resolution at lower cooling rates. The time delay for cooling rate calculations is the same at both low and high cooling rate regions (nτ kept constant throughout measurements). It will be observed in the later section that the lower cooling rate region has a lower travelling speed. The distance between initial and final temperature measurements for the cooling rate, which is represented by the transfer vector $(\Delta c_f^{n\tau}, \Delta r_f^{n\tau})$ in FIG. 6, is calculated based on the product of travelling speed and time delay (nτ). Hence, when the speed is lower, the spatial distance (transfer vector $(\Delta c_f^{n\tau}, \Delta r_f^{n\tau})$) between the final and initial temperature measurements is less (only a few pixels). As the distance between the final and initial temperature reduces, the chances of sensor error increase since the temperature pixels are closer. Thus, the noise at low cooling rate and travelling speed is mainly attributed to low sensor resolution.

Additionally, since the optimal PID gains are assigned for the staircase set-point, which contains two cooling rate values, it has been tuned for a combination of both set-points (850° C./s) and (430° C./s). Thus, the PID gains do not satisfy the most optimum response for each of these set-points individually, whereas, they are tuned to produce an average good response for both set-points. Comparing closed-loop cooling rate responses of the lines in sample G, the general performance of the controller is satisfactory under disturbances.

Figure 36:
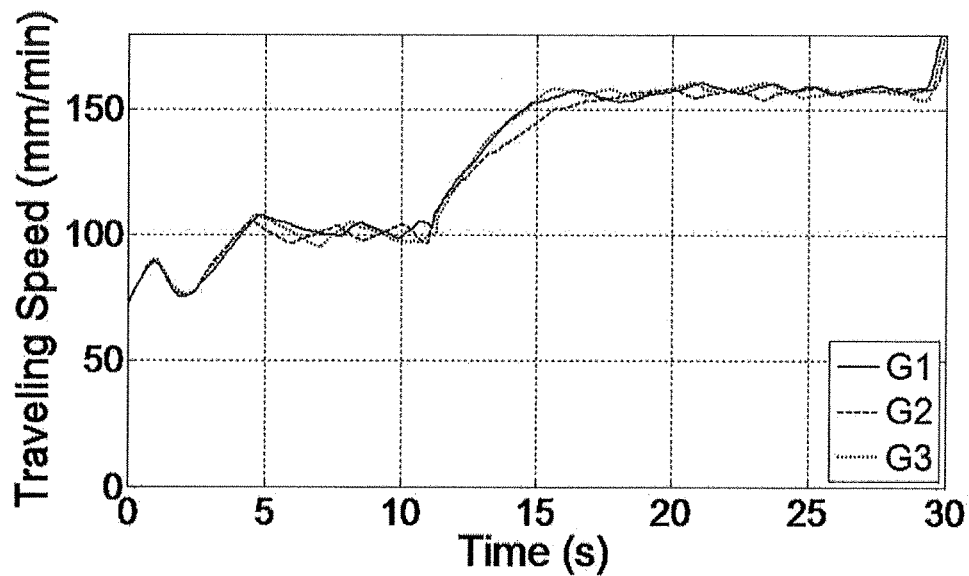
FIG. 36 is a graph showing closed-loop traveling speeds of sample G.

The closed-loop traveling speeds of the G samples are shown in FIG. 36. All the three deposited lines in the G sample (G1, G2 and G3), have similar closed-loop traveling speeds and cooling rates. It can be noted that the lower cooling rate region (430° C./s), has a lower stable speed compared to the higher cooling rate region (850° C./s). Therefore, the controller's response is logically correct considering the fact that at lower speeds lower cooling rate values are expected due to the higher amount of energy input.

Figure 37:
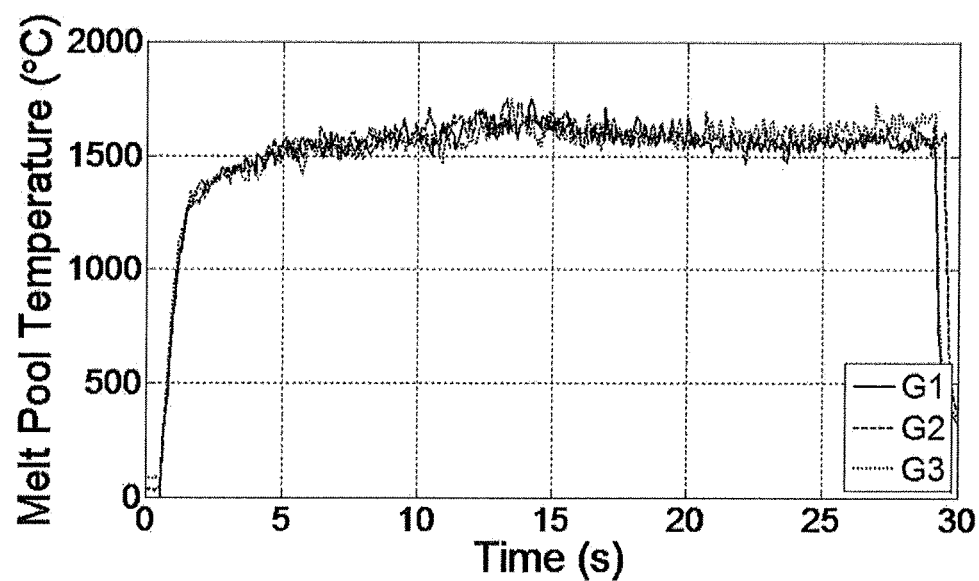
FIG. 37 is a graph showing closed-loop response of the melt pool temperature for sample G.

The melt pool temperature of the G sample is illustrated in FIG. 37. An unanticipated finding is that the melt pool temperature of the 430° C./s and (850° C./s) 50° C./s sections are not different. The temperature is found to be consistent, although, the cooling rate and the traveling speed are changing. This finding further supports the idea that small variations in the traveling speed do not affect the melt pool temperature, whereas, they influence the cooling rate and thus the microstructure significantly. Another hypothesis is the fact that at lower speed a larger melt pool size exists. Thus, although the melt pool temperature is equal for both the low and high traveling speed sections, the total amount of energy in each melt pool is different due to the changing dimension of the melt pool. The results indicate that the controller is able to conveniently track a desired response for the cooling rate at different set-points.

To determine microstructure control, the main aim of this research is to produce a desired controlled microstructure during the LAM process using the integrated closed-loop microstructure and geometry control scheme 1100. The proposed closed-loop control process was successful in controlling the cooling rate for multi-track claddings. Preliminary studies on microstructural evolutions suggest that a controlled cooling rate during the process should yield a controlled microstructure as well. Hence, to validate the performance of the closed-loop controller on microstructural evolutions, the samples were sectioned at two locations, one in the 430° C./s region and the other in the 850° C./s region, as shown in FIG. 34. If the microstructural trends of each line in the G sample are similar, the controller has been successful in controlling the microstructure during the LAM process. Although the melt pool temperature also influences the final microstructure, it is expected that the real-time cooling rate of the melt pool determines its general microstructure. This effective role of the cooling rate on the microstructure can also be investigated in the lower and higher cooling rate regions of the G samples, which have similar melt pool temperatures but different cooling rate values.

Figure 38A:
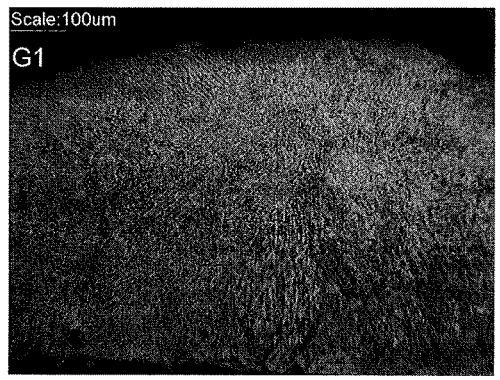
FIGS. 38a to 38c are micrographs of lines G1, G2 and G3 at a low cooling rate (closed-loop control at 430° C./s)
Figure 38B:
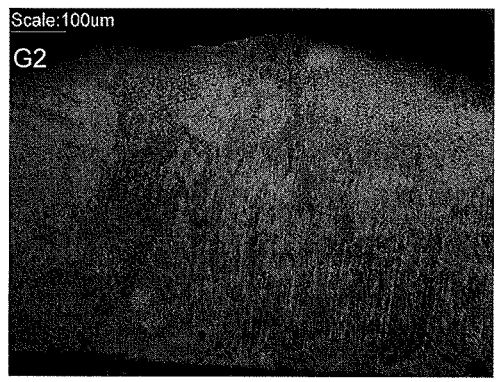
Figure 38C:
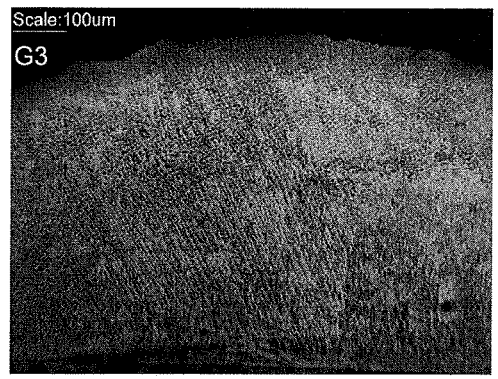
Figure 39C:
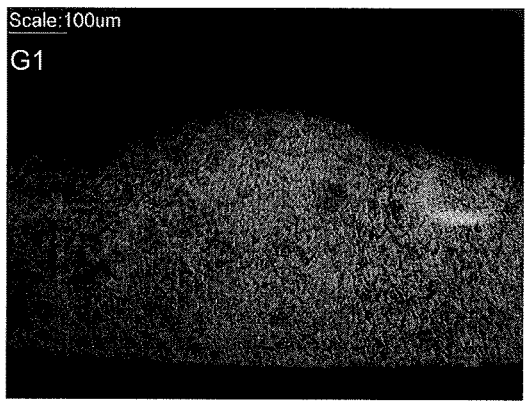
Figure 39C:
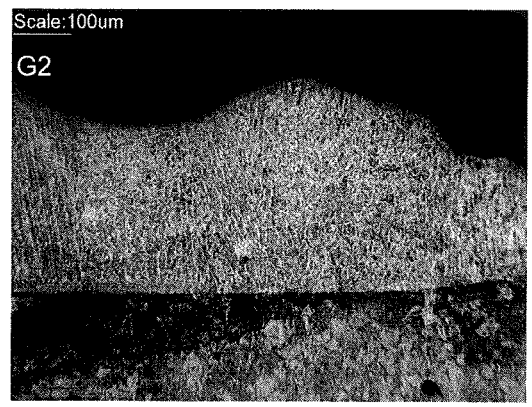
Figure 39C:
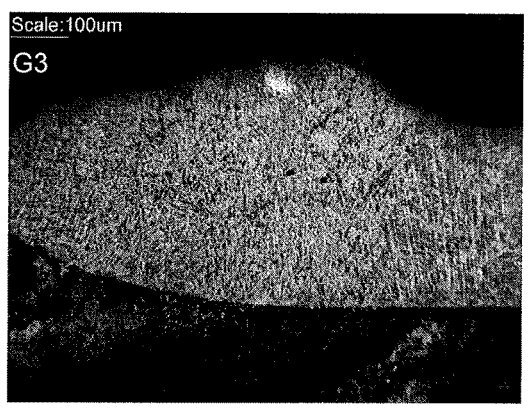

Optical micrographs obtained from sample G, at low (430° C./s) and high (850° C./s) cooling rates are shown in FIG. 38 and FIG. 39, respectively. It is apparent that all deposited lines in G have consistent similar microstructures at both cooling rate regions. To better illustrate the microstructure control and consistency in the G samples, higher magnification micrographs of these samples are presented in FIG. 40 and FIG. 41.

All three lines in sample G have a similar microstructure in terms of: (1) grain size, (2) cellular dendrite growth, (3) volumetric percentage of the columnar and cellular regions, and (4) volumetric percentage of the γ-austenite and δ-ferrite phases (white and dark regions of the micrographs shown in FIG. 41). Thus, by implementing a closed-loop control for the cooling rate during multi-track claddings in sample G, their microstructures were controlled consistently throughout the deposition. Although, the micrographs indicate very similar microstructures, quantitative measurements of the grain structures are required to verify their consistency.

Stainless steel has a granular structure when solidified in its' primary austenite phase. Hence, similar microstructures of stainless steel depositions should have similar grain size values. In order to quantitatively compare the influence of the cooling rate on microstructures, the grain size (or solidified dendrite cell size) of each cladding was measured as follows.

Figure 40A:
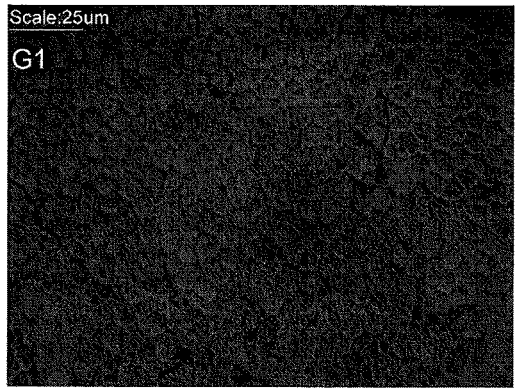
FIGS. 40a to 40c are high magnification micrographs of lines G1, G2 and G3 at low cooling rate (closed-loop control at 430° C./s)
Figure 40B:
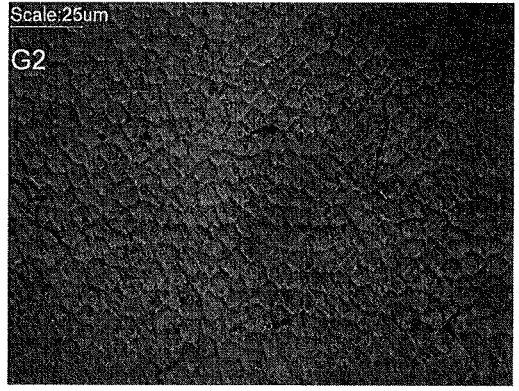
Figure 40C:
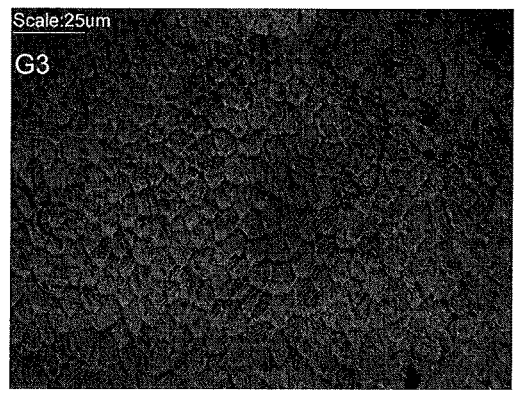
Figure 41A:
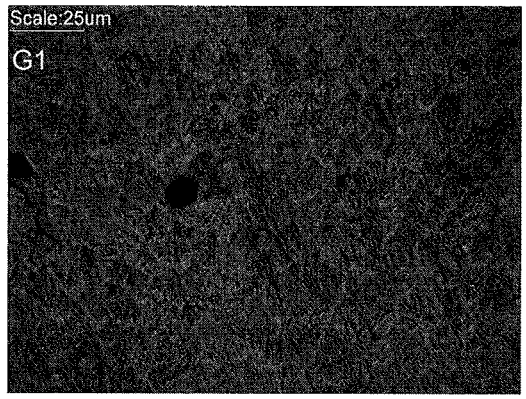
FIGS. 41a to 41c are high magnification micrographs of lines G1, G2 and G3 at high cooling rate (closed-loop control at 850° C./s).
Figure 41B:
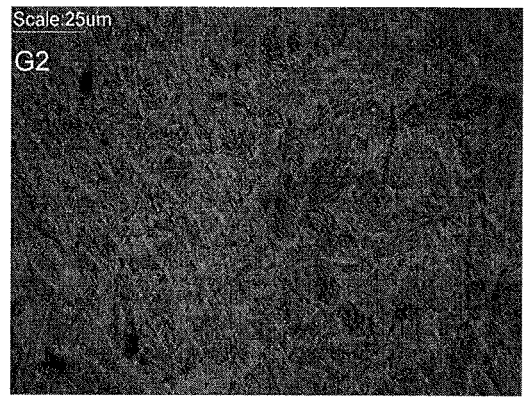
Figure 41C:
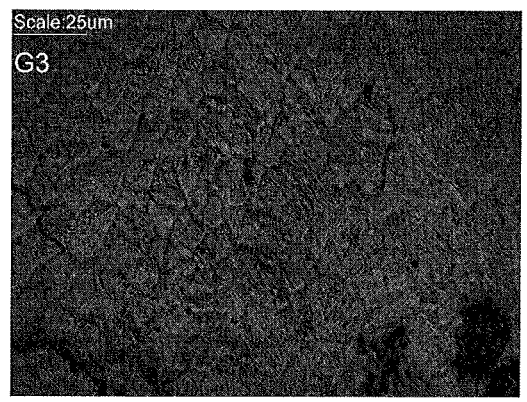

The ASTM grain size number was measured for the low cooling rate region, C=430° C./s, (FIG. 40). The Heyn lineal intercept procedure was used to obtain the ASTM grain size of the A samples. In this procedure three concentric circles were sketched on a random location of each sample and the number of grain boundary intersections with the circles, P, were counted. By dividing P with the actual length of the circles, L, the number of grain boundary intersections per unit length of the test line, $P_L$, is obtained. The mean lineal intercept length, l, is obtained as follows:

$$l = \frac{1}{P_L} \tag{1}$$

which has a unit of mm. Finally, the ASTM grain size number, $G_d$, is derived by the following:

$$G_d = (-6.643856 \log l) - 3.288. \tag{2}$$

The ASTM grain size number of each line in the G sample is listed in Table 9. According to Table 9, all the G lines have similar grain size values, which indicates consistent microstructure produced by the real-time microstructure controller.

TABLE 9

ASTM grain size number measured for the low cooling rate region, C = (430° C./s)

| | Sample No. | | |
|---|---|---|---|
| | G1 | G2 | G3 |
| ASTM Grain Size No. | 11.5 | 11.8 | 11.3 |

Considering that at high cooling rates, C=850° C./s, (FIG. 41) the G samples exhibited a needle-like martensite microstructure within the boundaries of the as-cast cellular structure, and so the grain sizes could not be directly related to the austenite/ferrite dendrite structures. However, it is obvious that based on the presence of martensite, a high cooling rate has been achieved with a consistent microstructure throughout the process.

It is noteworthy to point out that although the melt pool temperature is constant for both cooling rate regions (FIG. 37), the microstructures of the low cooling rate (FIG. 38) is different to that of the higher cooling rate (FIG. 39). Hence, it is concluded that maintaining a constant melt pool temperature does not lead to a similar microstructure, and instead the cooling rate has a direct correlation with microstructure. This is to the contrary to current understanding of thermal and material control of the process.

Moreover, in all the G lines, the low cooling rate region (430° C./s) has a larger grain size compared to the higher cooling rate region (850° C./s), which is in complete agreement with the information provided in literature.

Further experiments to perform a micro hardness analysis in closed-loop control of the microstructure was completed. To further assess the microstructure obtained by the real-time closed-loop microstructure controller, micro hardness tests were performed on the deposited clad lines in sample G as shown in Table 10 and Table 11. It is noted that all microhardness tests were performed at similar locations for all samples at the top of the clad cross section and a minimum number of three measurements were averaged to report the final value.

Another indication of a controlled microstructure is the similar hardness values measured for all deposited samples. According to results listed in Table 10, all the G samples have similar hardness results at low (430° C./s) and high cooling rate (850° C./s) regions. In other words, Table 10 and Table 11 indicate a significant approval of microstructure control for the deposited lines at both cooling rate regions. Interestingly, all the G specimens have a similar microhardness related to their consistent microstructures. Overall, hardness tests further support the correct functionality of the real-time microstructure controller for the LAM process.

Moreover, the consistent hardness values of the depositions indicate one of the several applications of the developed real-time microstructure controller. Using such a controller, one can produce consistent desired mechanical properties (e.g. hardness and wear) at different locations of a product, tailored to specific requirements.

TABLE 10

Micro hardness results (with standard deviation of ± 50 (HVN1000)) for G samples at low cooling rate $\left(\text{closed-loop control at } 430 \frac{°C.}{s}\right)$.

| Sample No. | G1 | G2 | G3 |
|---|---|---|---|
| Micro Hardness (HVN1000) | 330 | 301 | 336 |

TABLE 11

Micro hardness results (with standard deviation of ± 50 (HVN1000)) for G samples at high cooling rate $\left(\text{closed-loop control at } 850 \frac{°C.}{s}\right)$.

| Sample No. | G1 | G2 | G3 |
|---|---|---|---|
| Micro Hardness (HVN1000) | 426 | 439 | 467 |

Further experiments to perform Dilution and Clad Height Analysis in Closed-loop Control of the Microstructure were completed.

Although, results indicate that the microstructure has been controlled in real-time by the developed closed-loop system, the controller's effect on physical properties (e.g. clad height and dilution) should also be compared. The clad height and dilution of the G samples were measured to analyze the effect of cooling rate and melt pool temperature on these parameters. The geometrical definition of dilution is defined as follows:

$$\text{dilution} = \frac{h}{h+b} \quad (3)$$

h is the clad height, w is the clad width, θ is the angle of wetting, and b is the clad depth representing the thickness of substrate melted during the cladding and added to the clad region.

The clad height and dilution for the G samples are presented in Table 12. A consistent dilution and clad height is observed in all deposition lines of the G sample, which is due to the consistent performance of the microstructure controller. Thus, a closed-loop microstructure process with a constant cooling rate, results in a controlled clad height and dilution.

However, the low (430° C./s) and the high cooling regions (850° C./s) have different dilution and clad height values in Table 12. The different clad height and dilution is a concern since many applications require different desired microstructures with a constant geometry. The changing clad height for different closed-loop microstructure responses requires further attention and analysis.

TABLE 12

Dilution and clad height of the G sample for two cooling rate set-points.

| Sample | G1 $\left(430\frac{°C.}{s}\right)$ | G1 $\left(850\frac{°C.}{s}\right)$ | G2 $\left(430\frac{°C.}{s}\right)$ | G2 $\left(850\frac{°C.}{s}\right)$ | G3 $\left(430\frac{°C.}{s}\right)$ | G3 $\left(850\frac{°C.}{s}\right)$ |
|---|---|---|---|---|---|---|
| Clad Height | 138 μm | 75 μm | 145 μm | 70 μm | 140 μm | 86 μm |
| Dilution | 18% | 38% | 16% | 41% | 18% | 39% |

The cooling rate monitored with the real-time thermal dynamic monitoring scheme 800, and microstructure monitored with the indirect real-time monitoring scheme 900, demonstrate that solidification structures produced by the LAM process can be controlled using the integrated closed-loop microstructure and geometry control scheme 1100. However, no imaging system 7 was utilized in the current control scheme and only microstructure control was developed without any geometry control. The indirect real-time microstructure/geometry monitoring scheme 900 was utilized to indirectly monitor microstructural properties such as grain size and hardness in real-time. Based on cooling rate-microstructure observations, the thermal-microstructure map 1101 was used to derive desired cooling rate values for the desired microstructure properties. A PID controller was developed and used as the MIMO thermal-geometry controller 1102. The controller was responsible for controlling the real-time cooling rate by adjusting the travelling speed of deposition during the LAM process. The applied closed-loop microstructure control scheme 1100 is the first of its' kind in the LAM industry, since it can produce microstructures with a desired grain size and hardness in real-time. The growth of the cellular and columnar regions during metal deposition may also be controlled based on the cooling rate. Moreover, the volumetric percentage of each phase of the deposition can be controlled and set in-situ during deposition. The applications of the developed microstructure controller are quite broad and can be applied to various industries and applications.

Laser alloying (LA) is a TMP process in which the alloying elements are deposited on the workpiece surface and then melted by a high-power laser beam. The irradiation produces rapid melting and mixing, so that the alloy elements and ceramic materials disperse. In a very short period of time, cooling and solidification form a thin layer of the new alloy on the workpiece. This alloy layer and the substrate have strong binding force, high hardness and good wear resistance.

The microstructure and the geometry of the thin films produced in LA can be monitored and controlled in real-time using the indirect real-time microstructure/geometry monitoring scheme 900 and integrated closed-loop microstructure and geometry control scheme 1100. Real-time information of the cooling rate, melt pool temperature and heating rate can be implemented to identify and control the local properties of the LA process in real-time. In addition to indirect monitoring, the real-time thermal dynamic signals could also provide feedback signals for closed-loop control of the microstructural/geometrical properties of the alloy layer such as the phases, time of transformation during the process and thickness of the alloying layer.

In the preceding description, for purposes of explanation, numerous details are set forth in order to provide a thorough understanding of the embodiments. However, it will be apparent to one skilled in the art that these specific details may not be required in order to practice the invention. In some instances, well-known structures may be shown in block diagram form in order not to obscure the invention. For example, specific details are not provided as to whether the embodiments of the invention described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

Various embodiments are described herein. Variations of those embodiments may become apparent to those of ordinary skill in the art upon reading the foregoing description. It is expected that skilled persons will employ such variations as appropriate, and it is expected that the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

Further variations may be apparent or become apparent to those knowledgeable in the field, and are within the scope as defined by the claims.

What is claimed is:

1. A system for real-time monitoring and control of material microstructure or geometry in thermal materials processing (TMP) comprising:
    apparatus for directly measuring at least one thermal dynamic variable in real-time; and
    apparatus for developing a microstructure or geometry model based on a thermal model and the thermal dynamic variables;
    wherein the at least one thermal dynamic variables includes a cooling rate;
    wherein the apparatus for directly measuring at least one thermal dynamic variable is one of a thermal camera, a combined two-pyrometer setup or a charge coupled device (CCD)/complementary metal oxide semiconductor (CMOS) camera with an optical filter and a processor for calculating real time values for the thermal dynamic variables based on measurements from the thermal monitoring apparatus; and
    wherein the cooling rate is determined by directly measuring a first temperature for a first spatial point at a first moment in time and a second temperature for the first spatial point at a second moment in time via the apparatus for directly measuring at least one thermal dynamic variable and calculating the cooling/heating rate based on a difference between the first temperature and the second temperature and a time difference between the first moment in time and the second moment in time.

2. The system of claim 1 wherein the at least one thermal dynamic variable further comprises a heating rate or a peak temperature.

3. The system of claim 1 further comprising an apparatus for developing the thermal model.

4. The system of claim 3 wherein the apparatus for developing the thermal model comprises an apparatus for developing an adaptive thermal model.

5. The system of claim 4 wherein the adaptive thermal model is based on an adaptive lumped capacitive model, a 2-D or 3-D simplified conduction model, fuzzy modeling or neural network modeling.

6. The system of claim 1 further comprising at least one feedback or feed-forward controller for controlling the material microstructure or geometry.

7. The system of claim 1 further comprising:
a heat source; and
a cooling apparatus.

8. A method for real-time monitoring of microstructure or geometry of materials used in a thermal materials processing (TMP) procedure comprising:
obtaining a thermal microstructure model;
directly measuring a set of thermal dynamic variables of the thermal microstructure model by directly measuring a first temperature for a first spatial point at a first moment in time and a second temperature for the first spatial point at a second moment in time; and
applying the set of thermal dynamic variables to the thermal microstructure model wherein the set of thermal dynamic variables includes a cooling rate that is calculated based on a difference between the first temperature and the second temperature and a time difference between the first moment in time and the second moment in time;
wherein the apparatus for directly measuring at least one thermal dynamic variable is one of a thermal camera, a combined two-pyrometer setup or a charge coupled device (CCD)/complementary metal oxide semiconductor (CMOS) camera with an optical filter and a processor for calculating real time values for the thermal dynamic variables based on measurements from the thermal monitoring apparatus.

9. The method of claim 8 wherein directly measuring the set of thermal dynamic variables comprises:
measuring a peak temperature value.

10. The method of claim 8 wherein directly measuring the set of thermal dynamic variables comprises:
calculating a temperature rate change value.

11. The method of claim 10 wherein calculating the temperature rate change value comprises:
determining the first temperature value for the first spatial point at the first moment in time;
determining a transfer vector for movement of the first spatial point;
determining the second temperature value for the first spatial point using a transfer vector for movement at the second moment in time;
measuring the time difference between first moment in time and the second moment in time;
calculating a temperature difference between the second temperature value and the first temperature value for the first spatial point; and
dividing the temperature difference by the time delay.

12. The method of claim 8 wherein obtaining a thermal microstructure model comprises:
modelling an expected microstructure.

13. The method of claim 8 wherein applying the set of thermal dynamic variables comprises:
combining the thermal microstructure model with the set of thermal dynamic variables.

* * * * *